United States Patent
Eun et al.

(10) Patent No.: US 10,484,161 B2
(45) Date of Patent: Nov. 19, 2019

(54) APPARATUS AND METHOD FOR CONTROLLING DECODING

(71) Applicant: Samsung Electronics Co., Ltd., Gyeonggi-do (KR)

(72) Inventors: Yoochang Eun, Seoul (KR); Mingoo Kim, Gyeonggi-do (KR); Chaehag Yi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 184 days.

(21) Appl. No.: 15/228,512

(22) Filed: Aug. 4, 2016

(65) Prior Publication Data

US 2017/0070980 A1    Mar. 9, 2017

(30) Foreign Application Priority Data

Sep. 4, 2015 (KR) .................. 10-2015-0125739

(51) Int. Cl.
*H04L 5/00* (2006.01)
*H04L 1/00* (2006.01)

(52) U.S. Cl.
CPC .......... *H04L 5/0092* (2013.01); *H04L 1/0046* (2013.01); *H04L 1/0053* (2013.01); *H04L 1/0072* (2013.01); *H04L 5/0053* (2013.01)

(58) Field of Classification Search
CPC ... H04L 5/0092; H04L 1/0046; H04L 1/0053; H04L 1/0072; H04L 5/0053
See application file for complete search history.

(56) References Cited

U.S. PATENT DOCUMENTS

| | | | |
|---|---|---|---|
| 8,917,697 B2 | 12/2014 | Miki et al. | |
| 9,014,132 B2 | 4/2015 | Nakao et al. | |
| 2007/0076587 A1* | 4/2007 | Kwon | H04L 1/0004 370/208 |
| 2009/0257449 A1* | 10/2009 | Chen | H04L 1/0041 370/470 |
| 2010/0272004 A1* | 10/2010 | Maeda | H04L 5/0007 370/312 |

(Continued)

FOREIGN PATENT DOCUMENTS

| | | |
|---|---|---|
| KR | 102015-0040993 | 4/2015 |
| WO | WO 2013/085271 | 6/2013 |

OTHER PUBLICATIONS

Dongwoon Bai et al., Systematic pruning of blind decoding results, IEEE, Mobile Solutions Lab, Samsung US R&D Center, San Diego, CA, 2012.

*Primary Examiner* — Ian N Moore
*Assistant Examiner* — Latresa A McCallum
(74) *Attorney, Agent, or Firm* — The Farrell Law Firm, P.C.

(57) ABSTRACT

A method and an apparatus are provided for determining a downlink control indicator (DCI) at a receiver. A signal is received at the receiver. The receiver measures channel quality based on the received signal. Signals of physical downlink control channel (PDCCH) areas that correspond to each channel format indicator (CFI) in the received signal are decoded, if a measurement of the channel quality is not a configuration condition. The receiver obtains the CFI by decoding a physical control format indicator channel (PC-FICH) of the received signal, if the measurement of the channel quality is the configuration condition. The receiver determines the DCI based on the decoded signals.

17 Claims, 16 Drawing Sheets

(56) References Cited

U.S. PATENT DOCUMENTS

| | | | |
|---|---|---|---|
| 2011/0182385 A1 | 7/2011 | Doan et al. | |
| 2011/0243066 A1* | 10/2011 | Nayeb Nazar | H04L 1/007 370/328 |
| 2011/0299489 A1* | 12/2011 | Kim | H04L 1/0046 370/329 |
| 2013/0021994 A1* | 1/2013 | Ji | H04L 5/0055 370/329 |
| 2013/0051355 A1 | 2/2013 | Hong | |
| 2013/0136095 A1 | 5/2013 | Nishio et al. | |
| 2013/0188577 A1* | 7/2013 | Papasakellariou | H04W 72/04 370/329 |
| 2014/0092731 A1 | 4/2014 | Gupta | |
| 2014/0133425 A1 | 5/2014 | Kim et al. | |
| 2014/0133427 A1 | 5/2014 | Kim et al. | |
| 2014/0269595 A1 | 9/2014 | Lee et al. | |
| 2014/0286281 A1 | 9/2014 | Jang et al. | |
| 2014/0321414 A1 | 10/2014 | Chun et al. | |
| 2015/0023266 A1* | 1/2015 | Imamura | H04W 72/042 370/329 |

* cited by examiner

APPARATUS AND METHOD FOR CONTROLLING DECODING

PRIORITY

This application claims priority under 35 U.S.C. § 119(a) to Korean Patent Application Serial No. 10-2015-0125739, which was filed in the Korean Intellectual Property Office on Sep. 4, 2015, the content of which is incorporated herein by reference.

BACKGROUND

1. Field of the Disclosure

The present disclosure relates generally to an apparatus and a method for controlling the decoding, and more particularly, to a method and an apparatus for improving a decoding success rate when a channel quality is poor.

2. Description of Related Art

With the development of communication technologies, in addition to cellular communication service, there is a growing demand for a variety of communication services, such as, for example, Internet of Things (IoT). The demand for communication service variety may result in wireless communication devices being located in various communication environments. If the communication environment is not good, a decoding success rate of the wireless communication device may be deteriorated.

SUMMARY

An aspect of the present disclosure provides an apparatus and a method for decoding received data when a communication environment is not good.

In accordance with an aspect of the present disclosure, a method is provided for determining a downlink control indicator (DCI) at a receiver. A signal is received at the receiver. The receiver measures channel quality based on the received signal. Signals of physical downlink control channel (PDCCH) areas that correspond to each channel format indicator (CFI) in the received signal are decoded, if a measurement of the channel quality is not a configuration condition. The receiver obtains the CFI by decoding a physical control format indicator channel (PCFICH) of the received signal, if the measurement of the channel quality is the configuration condition. The receiver determines the DCI based on the decoded signals.

In accordance with another aspect of the present disclosure, a receiver is provided that includes a demodulator that demodulates a received signal, and a channel quality measuring unit that measures a channel quality of the received signal. The receiver also includes a channel decoder that includes a PDCCH decoder and decodes the demodulated signal for each channel, and a processor that is connected with the channel quality measuring unit and the channel decoder. The processor is configured to measure the channel quality based on the received signal. The processor is also configured to decode signals of PDCCH areas that correspond to each CFI in the received signal, if a measurement of the channel quality is not a configuration condition. The processor is additionally configured to obtain the CFI by decoding a PCFICH of the received signal, if the measurement of the channel quality is the configuration condition. The processor is further configured to determine a downlink control indicator (DCI) based on the decoded signals.

In accordance with an additional aspect of the present disclosure, a method is provided for determining a downlink control indicator (DCI). A signal is received at a receiver. The receiver determines whether a difference between a maximum value and a minimum value of one of a signal to interference and noise ratio (SINR), a carrier to interference and noise ratio (CINR), a received signal strength indicator (RSSI), and a PCFICH of the received signal meets a preset configuration condition. The receiver decodes signals of PDCCH areas that correspond to each CFI in the received signal, if the difference does not meet the configuration condition. The receiver obtains the CFI by decoding the PCFICH of the received signal, if the difference meets the configuration condition. The receiver determines the DCI based on the decoded signals or the decoded PCFICH.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
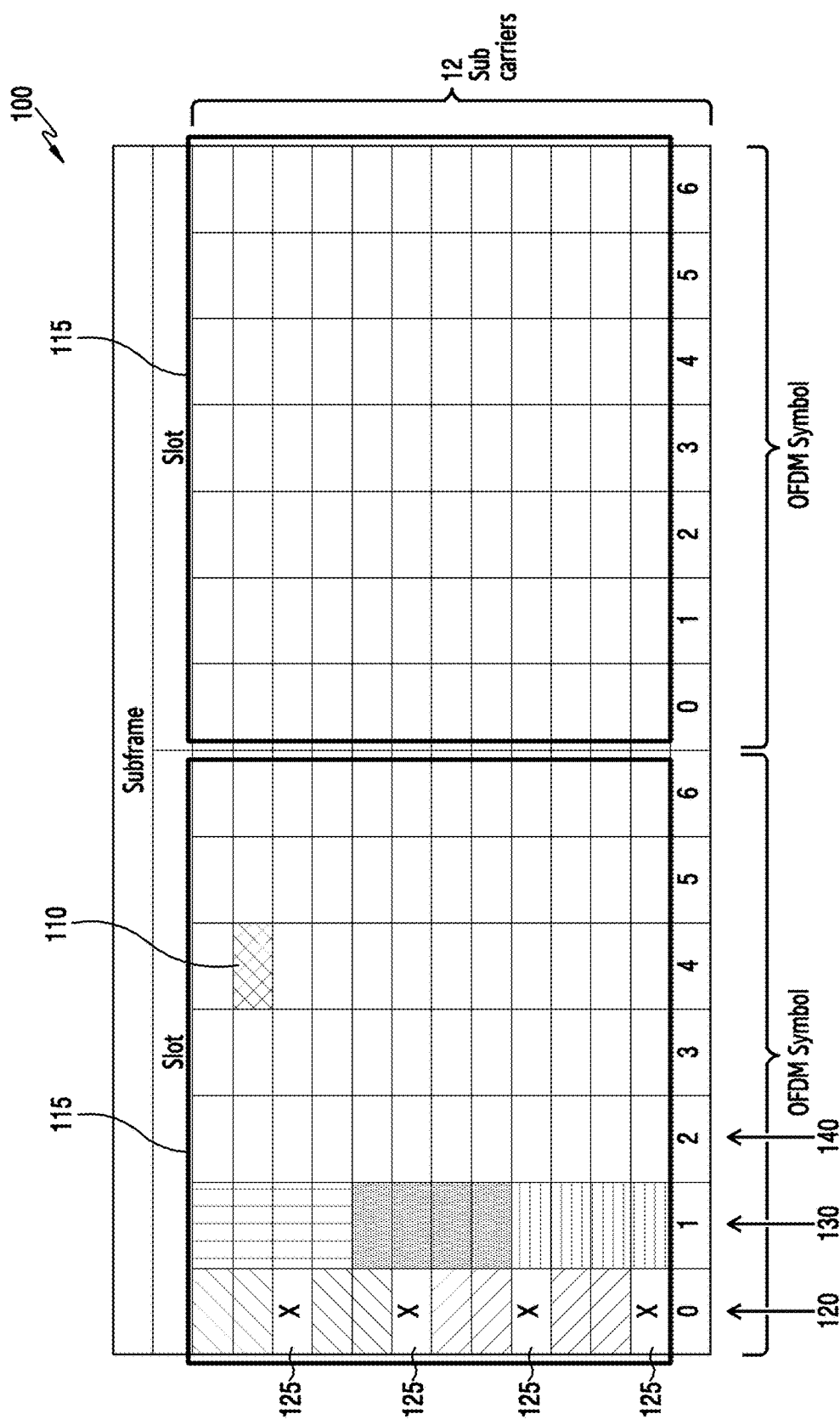
FIG. 1 is a diagram illustrating a long term evolution (LTE) resource grid.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms used herein are only used to describe specific embodiments, and are not intended to limit the present disclosure. As used herein, singular forms may include plural forms as well, unless the context clearly indicates otherwise. Unless defined otherwise, all terms used herein, including technical and scientific terms, have the same meanings as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even a term that is defined herein should not be interpreted to exclude other embodiments of the present disclosure.

Various embodiments of the present disclosure are described in terms of a hardware-based approach. However, the various embodiments of the present disclosure may encompass a technology that uses both hardware and software, and thus, are not intended to exclude a software-based approach.

A receiving device (or a receiver), according to various embodiments of the present disclosure, may improve the performance of LTE downlink in a low channel quality area. The receiving device decodes a PCFICH for each subframe in order to detect a CFI value. In addition, the receiving device determines a PDCCH area that is a control channel, according to the detected CFI value. If an error occurs in the detected CFI value, the receiving device may fail to decode the PDCCH. As a result, the decoding of a PDSCH may fail as well. Therefore, in the area where the error rate of the PCFICH is greater than the error rate of the PDCCH or PDSCH, decoding performance of the PCFICH may limit decoding performance of the PDCCH or PDSCH. In order to enhance the performance of the PCFICH in an environment with unfavorable channel quality, the receiving device additionally decodes the PDCCH for available CFI values, and obtains DCI information from the decoding result. The receiving device improves a PDCCH decoding success rate even when errors exist in the decoding of the PCFICH. The receiving device is then able to obtain an accurate CFI value from the PDCCH decoding result.

FIG. 1 is a diagram illustrating an LTE resource grid. FIG. 1 may be a subframe structure. The LTE resource grid may be one of two types, which include a normal cyclic prefix and an extended cyclic prefix. FIG. 1 relates to the normal cyclic prefix. The extended cyclic prefix may have a similar LTE resource grid structure. Accordingly, the present disclosure may be applied to the extended cyclic prefix as well as the normal cyclic prefix.

Referring to FIG. 1, an LTE resource grid 100 may be referred to as an LTE resource block. The horizontal axis of the LTE resource grid 100 denotes a time axis. The vertical axis the LTE resource grid 100 denotes a frequency axis.

A single frame has a length of 10 ms, and is comprised of 10 subframes. A single subframe has a length of 1 ms, and is comprised of two slots. One slot is configured with twelve resource element (RE) symbols that are arranged on the frequency axis (the vertical axis), and seven OFDM symbol columns that are arranged on the time axis (the horizontal axis).

The frequency axis is composed of subcarriers.

A block 110 refers to an RE. The RE is a minimum resource unit in the LTE system. The block 110 is specified by one OFDM symbol of the time axis and one subcarrier of the frequency axis.

A window 115 refers to a resource block (RB). The resource block includes seven OFDM symbol columns of the time axis and twelve subcarriers of the frequency axis. The resource block is composed of 84 resource elements.

A resource element group (REG) includes four consecutive REs, or four REs that are separated by a cell-specific reference signal (RS). For example, column 120 (i.e., the OFDM symbol column 0 in the first slot of the subframe) includes two resource element groups (REGs). Each of the two REGs includes four REs that are separated by a cell-specific RS 125. Column 130 (i.e., the OFDM symbol column 1 in the first slot of the subframe) includes three REGs. Each of the three REGs includes four consecutive REs.

In FIG. 1, the PCFICHs are disposed in the first symbol column 120 of the subframe. The PDCCHs are disposed in some or all of the first symbol column 120 to a third symbol column 140 of the subframe.

Figure 2:
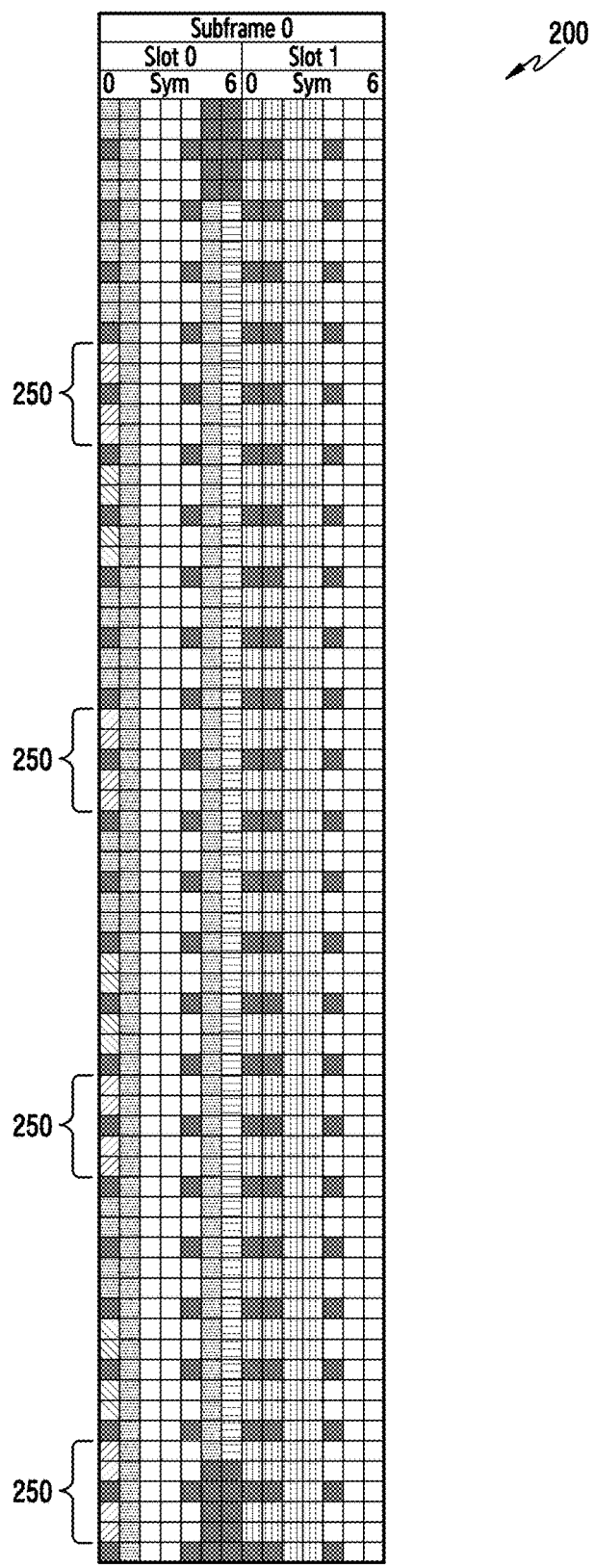
FIG. 2 is a diagram illustrating an LTE resource grid showing a PCFICH.

FIG. 2 is a diagram illustrating an LTE resource grid showing the PCFICH.

The PCFICH is mapped with the first OFDM symbol column of each downlink subframe. The data of the PCFICH is transferred by four REGs. The four REGs are evenly distributed over all bands regardless of a bandwidth. The exact position of the PCFICH is determined by a cell ID and a bandwidth.

Referring to FIG. 2, an LTE resource grid 200 includes four PCFICH segments mapped with four REGs 250.

Figure 3A:
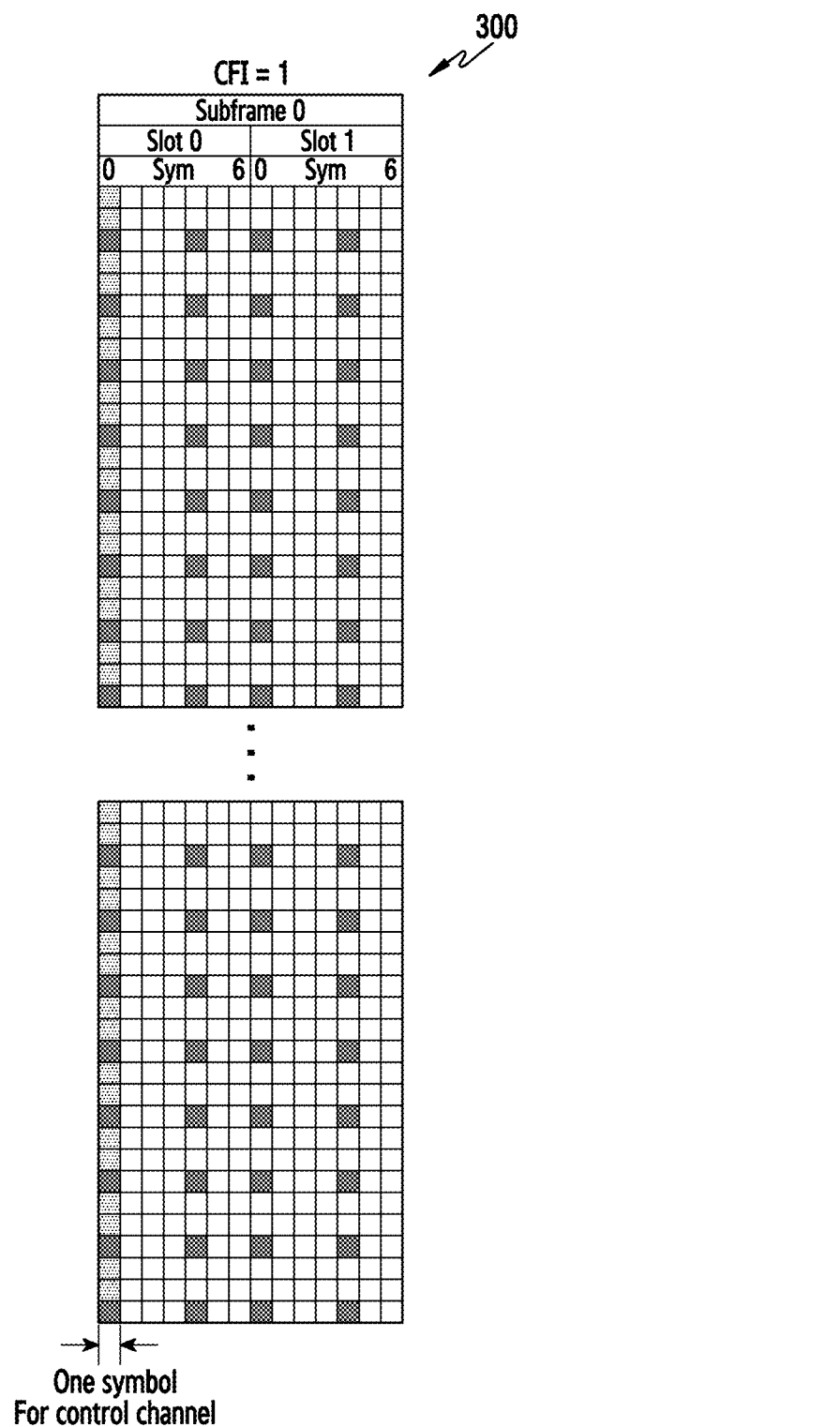
FIG. 3A to FIG. 3C are diagrams illustrating LTE resource grids showing the allocation of control channels in accordance with a CFI.
Figure 3B:
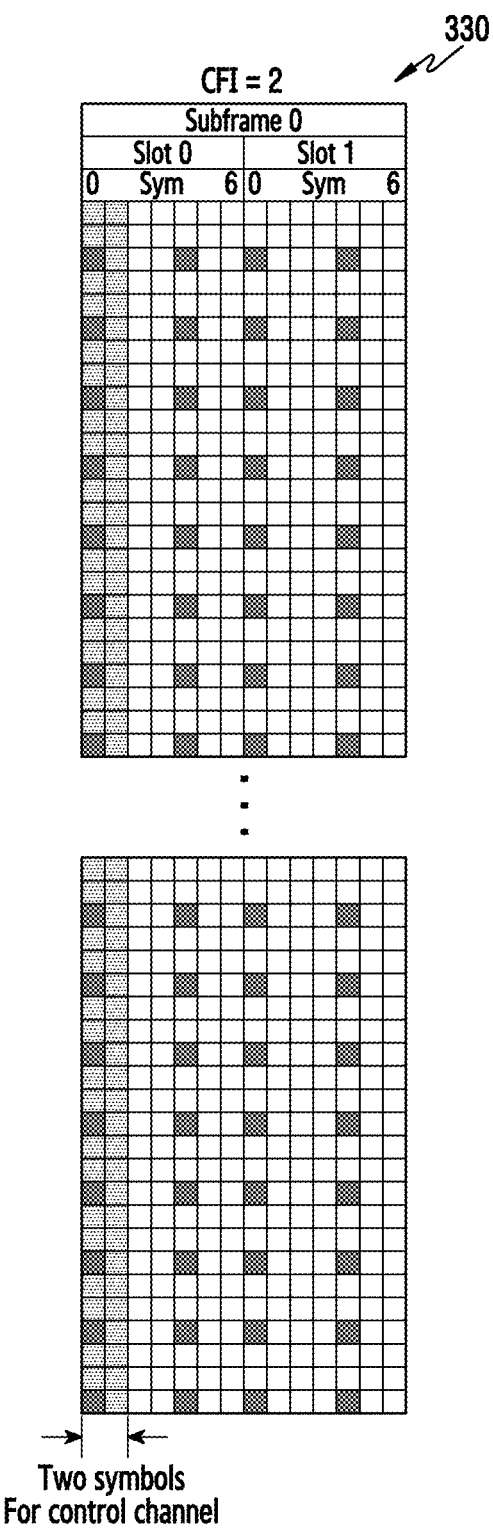
Figure 3C:
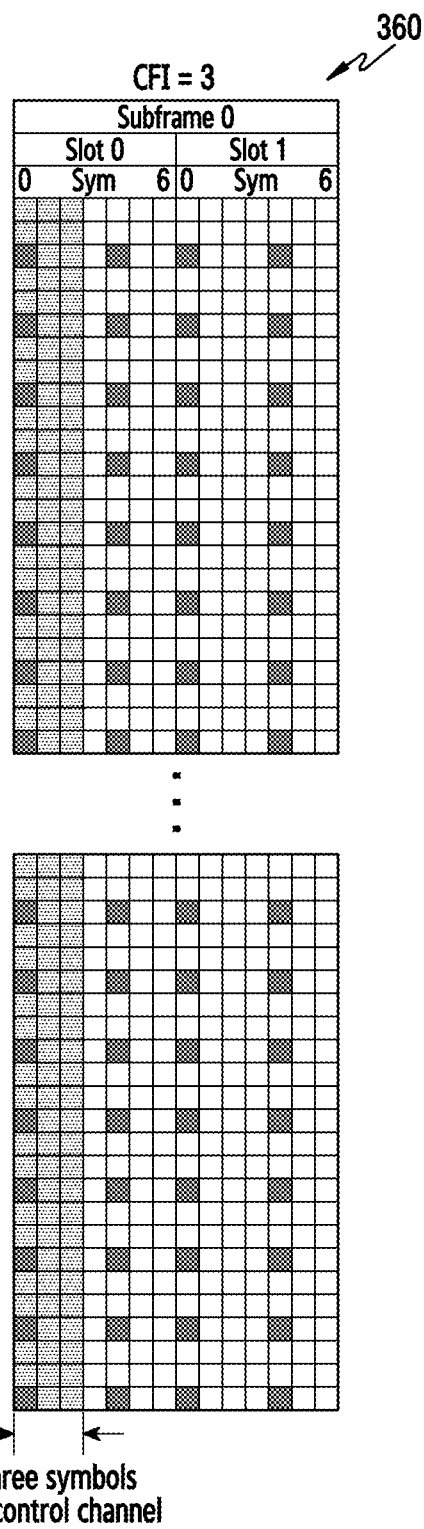

FIG. 3A to FIG. 3C are diagrams illustrating LTE resource grids showing the allocation of control channels in accordance with the CFI.

The PCFICH forwards the number of symbols that are used in a control channel (e.g., the PDCCH or a physical hybrid-ARQ indicator channel (PHICH)). The PCFICH indicates the number of symbols that are used in the control channel through the CFI. For example, the CFI may indicate the number of PDCCHs that are allocated. The CFI is obtained through the decoding of the PCFICH. The CFI typically has three values (i.e., CFI=1, CFI=2, or CFI=3). If the CFI is configured to be 1 for a single subframe, it means that one symbol column (i.e., the first symbol column) is used for PDCCH allocation in the subframe. If the CFI is configured to be 2 for a single subframe, it means that two symbol columns (i.e., the first and the second symbol columns) are used for PDCCH allocation in the subframe. If the CFI is configured to be 3 for a single subframe, it means that three symbol columns (i.e., the first, the second, and the third symbol columns) are used for PDCCH allocation in the subframe.

In addition, when the total number of RBs in one slot, such as a bandwidth of 1.4 MHz, is less than or equal to 10, the CFI value may be interpreted as CFI=2, CFI=3, or CFI=4 (that is, the number of symbols that are used in the control channel may be 2, 3, or 4, respectively).

Referring to FIG. 3A, an LTE resource grid 300 represents resource allocation of the control channel when the CFI is equal to 1. For example, the control channel may be the PDCCH. When the CFI is equal to 1, as shown in the LTE resource grid 300, the first OFDM symbol columns are used for the PDCCH allocation for one subframe.

Referring to FIG. 3B, an LTE resource grid 330 represents resource allocation of the control channel when the CFI is equal to 2. When the CFI is equal to 2, as shown in the LTE resource grid 330, the first and the second OFDM symbol columns are used for the PDCCH allocation for one subframe.

Referring to FIG. 3C, an LTE resource grid 360 represents resource allocation of the control channel when the CFI is equal to 3. When the CFI is equal to 3, as shown in the LTE resource grid 360, the first to the third OFDM symbol columns are used for the PDCCH allocation for one subframe.

Figure 4:
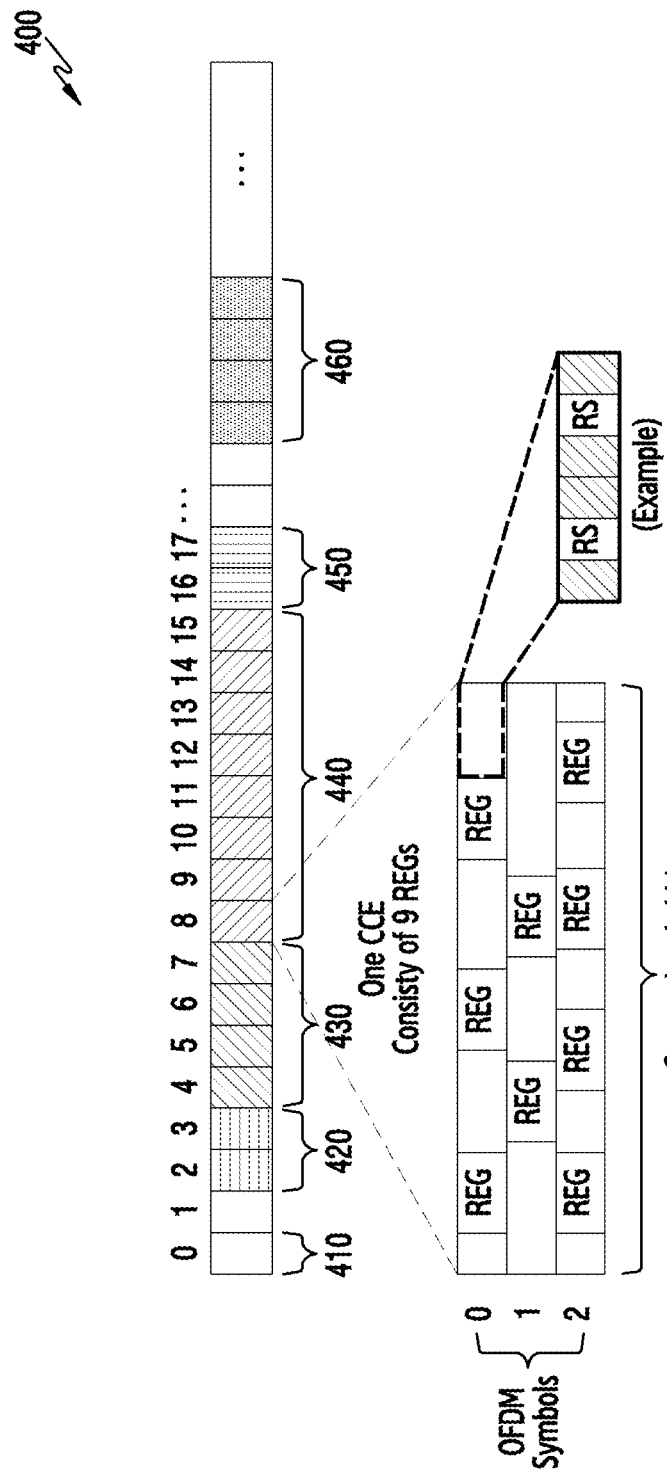
FIG. 4 is a resource diagram illustrating an aggregation level of a PDCCH.

FIG. 4 is a resource diagram illustrating an aggregation level of the PDCCH.

As described above, the PDCCHs are initially mapped with N (N=1, N=2, or N=3) OFDM symbol columns in each downlink subframe. The PDCCH forwards the DCI. The DCI forwards a transport format, resource allocation, or H-ARQ information, which are related to DL-shared channel (SCH), UL-SCH, or the like. The DCI is obtained by decoding the PDCCH.

The PDCCH includes control channel elements (CCEs). The CCE includes 9 REGs. The CCE are distributed in the system bandwidth and the OFDM symbols (as described above, the first, the first and the second, or the first to the third OFDM symbol columns) through interleaving for attenuating interference and securing diversity. In the PDCCH, the number of CCEs may be referred to as a CCE aggregation level. The CCE aggregation level may be 1, 2, 4, or 8 (consecutive CCEs). The total number of available CCEs is determined by the PCFICH configuration and the system bandwidth. In a single subframe, different PDCCHs may utilize different aggregation levels.

Referring to FIG. 4, PDCCH resource diagram 400 includes a plurality of PDCCHs. The plurality of PDCCHs may have different CCE aggregation levels. PDCCH 410 is CCE aggregation level 1. PDCCHs 420 and 450 are CCE aggregation level 2. PDCCHs 430 and 460 are CCE aggregation level 4. PDCCH 440 is CCE aggregation level 8. As shown in the PDCCH resource diagram 400, the PDCCH, having CCE aggregation level n (n=1, 2, 4, or 8), starts at a position where the remainder given by dividing a CCE index by 'n' is zero {that is, (CCE index mod n)=0}. For example, in the PDCCH resource diagram 400, the PDCCH having CCE aggregation level 4 (e.g., the PDCCH 430) starts at the CCE index of 0, 4, 8, 12, 16, or the like. The PDCCH start position according to the CCE aggregation level is useful for the blind search.

Since the CCE aggregation level is 8, the PDCCH 440 includes eight CCEs. Each CCE includes nine REGs that are diffused in the system bandwidth and the OFDM symbols through interleaving. The total number of REs required for the PDCCH 440 is 288 (i.e., 8×9×4=288). Likewise, the total number of REs required for the PDCCH 410 is 36 (i.e., 1×9×4=36).

The aggregation level may accommodate different wireless communication environments. For example, when the DCI format is determined (or fixed), the higher CCE aggregation level may provide better coding and reliability to the receiving device in a poor wireless communication environment.

Figure 5:
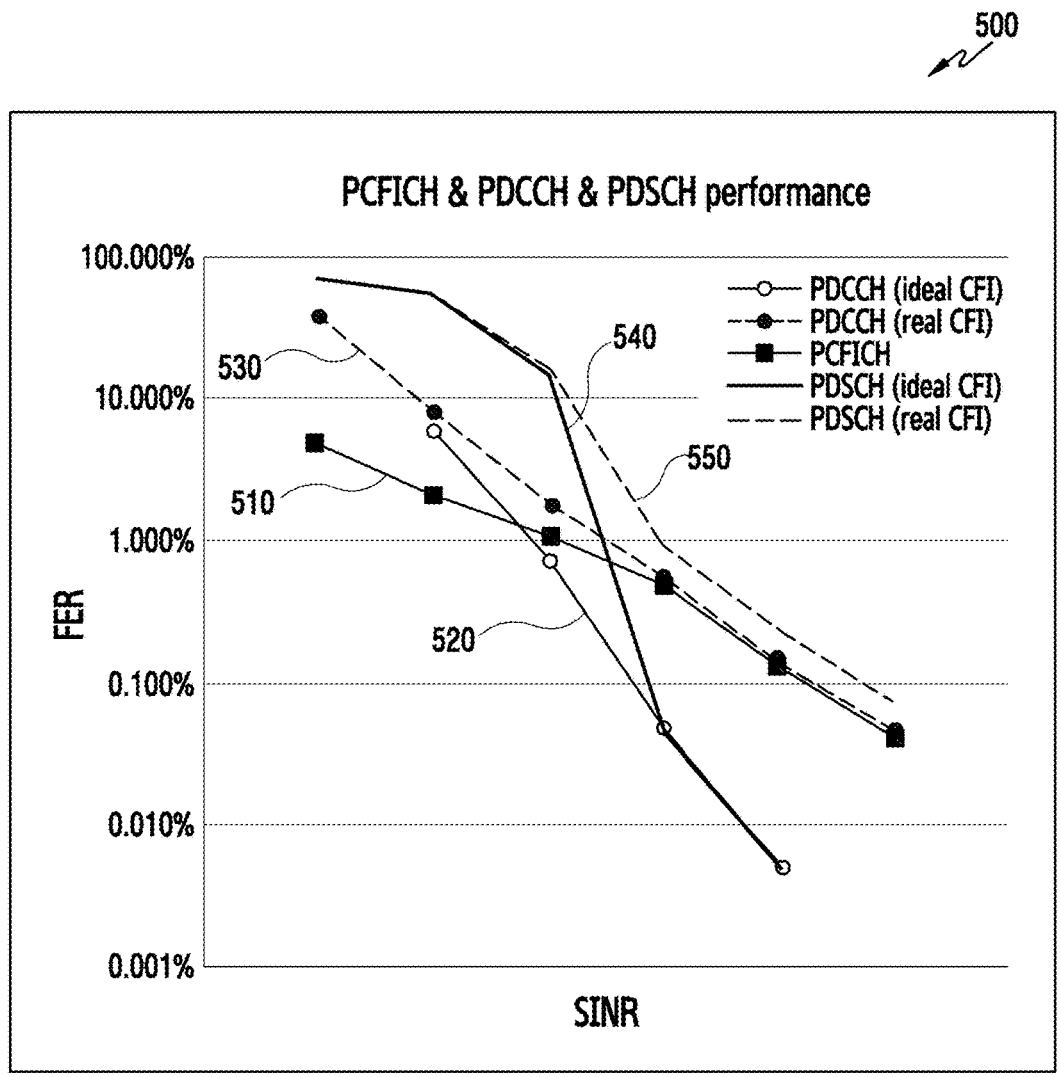
FIG. 5 is a graph illustrating the relationship between a PCFICH decoding success rate, a PDCCH decoding success rate, and a physical downlink shared channel (PDSCH) decoding success rate in a low SINR area.

FIG. 5 is a graph illustrating the relationship between a PCFICH decoding success rate, a PDCCH decoding success rate, and a PDSCH decoding success rate in a low SINR area.

In the LTE downlink, a receiver decodes the PCFICH for each subframe in order to obtain the CFI value. The receiver obtains PDCCH allocation area information (for example, information on whether or not the PDCCHs are allocated to the first symbol column, the first and second symbol columns, or the first through third symbol columns of each subframe) through the CFI value. The receiver decodes the PDCCH based on the PDCCH allocation area information. The receiver obtains the DCI through the decoding of the PDCCH. The DCI includes allocation information that includes the number and positions of RBs of the PDSCH. The receiver may successfully decode the PDSCH based on the DCI. Decoding success rates of the PDCCH and the PDSCH rely on a decoding success rate of the PCFICH. This is due to the fact that if it fails to decode the PCFICH, the receiver may not obtain the CFI value, or may obtain a distorted CFI value, which may lead to a failure in the decoding the PDCCH and the PDSCH.

Referring to FIG. 5, the horizontal axis of graph 500 indicates the SINR. The horizontal axis of the graph 500 may indicate an SINR having a low value.

The vertical axis of the graph 500 indicates a frame error rate (FER). The vertical axis of the graph 500 is represented in a percentage (%) indicating the decoding success rate.

In the graph 500, a curve 510 indicates the FER of the PCFICH according to the SINR. In the curve 510, as the SINR increases, the PCFICH provides a lower FER (i.e., high performance or a high decoding success rate).

Provided that the CFI has been obtained (that is, when the decoding of the PCFICH was successful), a curve 520 indicates the FER of the PDCCH according to the SINR. In the curve 520, as the SINR increases, the PDCCH provides a lower FER (i.e., high performance or a high decoding success rate).

A curve 530 indicates the FER of an actual PDCCH according to the SINR. The curve 530 has a higher FER (i.e., a low decoding success rate) than the curve 520. As shown in the graph 500, the curve 530 includes a section where the curve 530 and the curve 510 have similar FER values. This means that if the receiver fails to decode the PCFICH, it may fail to decode the actual PDCCH as well. Specifically, the decoding success rate of the PDCCH may depend on the decoding success rate of the PCFICH.

Provided that the CFI has been obtained (that is, when the decoding of the PCFICH was successful), a curve 540 indicates the FER of the PDSCH according to the SINR. In the curve 540, as the SINR increases, the PDSCH provides a lower FER.

A curve 550 indicates the FER of the actual PDSCH according to the SINR. The curve 550 has a higher FER (i.e., a low decoding success rate) than the curve 540. As shown in the graph 500, the curve 550 includes a section where the curve 550 and the curve 510 have similar FER values. This means that when the receiver fails to decode the PCFICH, it may fail to decode the PDCCH, and accordingly, it may fail to decode the PDSCH. Specifically, the decoding success rate of the PDSCH may depend on the decoding success rate of the PCFICH.

Embodiments of the present disclosure may enhance the decoding success rate of the PDCCH or PDSCH even when the channel quality is poor (that is, the communication environment is poor, for example, when the SINR is low).

Figure 6:
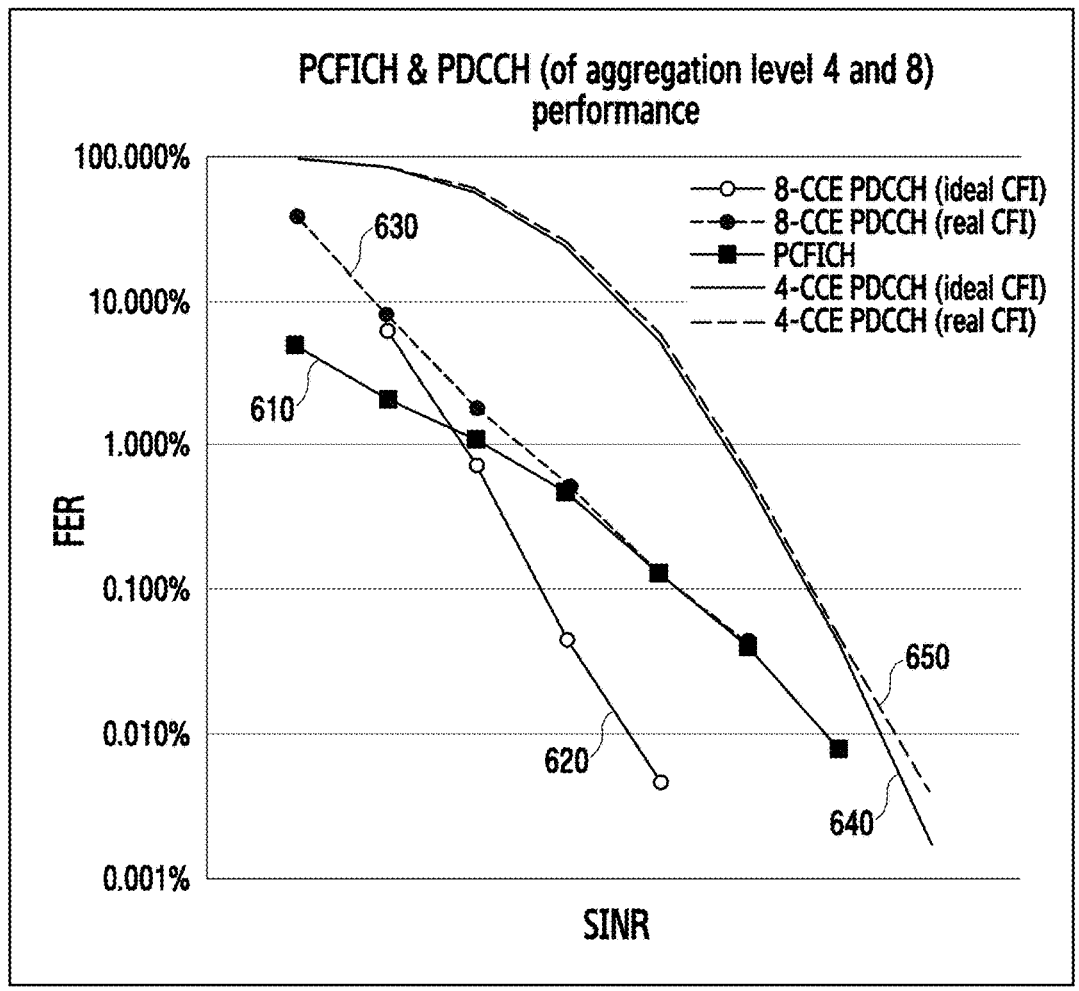
FIG. 6 is a graph illustrating the relationship between a PCFICH decoding success rate and a PDCCH decoding success rate for each aggregation level in a low SINR area.

FIG. 6 is a graph illustrating the relationship between the PCFICH decoding success rate and the PDCCH decoding success rate for each aggregation level in a low SINR area.

Referring to FIG. 6, the horizontal axis of graph 600 indicates the SINR. The horizontal axis of the graph 600 may indicate the SINR having a low value.

The vertical axis of the graph 600 indicates FER. The vertical axis of the graph 600 is shown as a percentage (%) that indicates the decoding success rate.

In the graph 600, a curve 610 indicates the FER of the PCFICH according to the SINR. In the curve 610, as the SINR increases, the PCFICH provides a lower FER (i.e., high performance or a high decoding success rate).

Provided that the CFI has been obtained (that is, when the decoding of the PCFICH was successful), curve 620 indicates the FER of the PDCCH of the CCE aggregation level 8 according to the SINR. In the curve 620, as the SINR increases, the PDCCH provides a lower FER.

Curve 630 indicates the FER of the PDCCH of the actual CCE aggregation level 8 according to the SINR. The curve 630 has a higher FER (i.e., a low decoding success rate) than the curve 620. As shown in the graph 600, the curve 630 includes a section where the curve 630 and the curve 610 have similar FER values. This means that if the receiver fails to decode the PCFICH, it may fail to decode the PDCCH of the actual CCE aggregation level 8. Specifically, the decoding success rate of the PDCCH of the CCE aggregation level 8 depends on the decoding success rate of the PCFICH.

Provided that the CFI has been obtained, curve 640 indicates the FER of the PDCCH of the CCE aggregation level 4 according to the SINR. In the curve 640, as the SINR increases, the PDCCH of the CCE aggregation level 4 provides a lower FER.

Curve 650 indicates the FER of the PDCCH of the actual CCE aggregation level 4 according to the SINR. The curve 650 has a higher FER (i.e., a low decoding success rate) than the curve 640. The curve 650 has a small portion that matches the curve 610 compared to the curve 630. In addition, the curve 650 is slightly different from an ideal curve (meaning the curve 640 in the case of the curve 650, or the curve 620 in the case of the curve 630), compared to the curve 630. Accordingly, the PDCCH of the CCE aggregation level 4 is less affected by the decoding result of the PCFICH, compared to the PDCCH of the CCE aggregation level 8. However, the decoding of the PDCCH of the CCE aggregation level 8 is dependent on the decoding result of the PCFICH.

Figure 7:
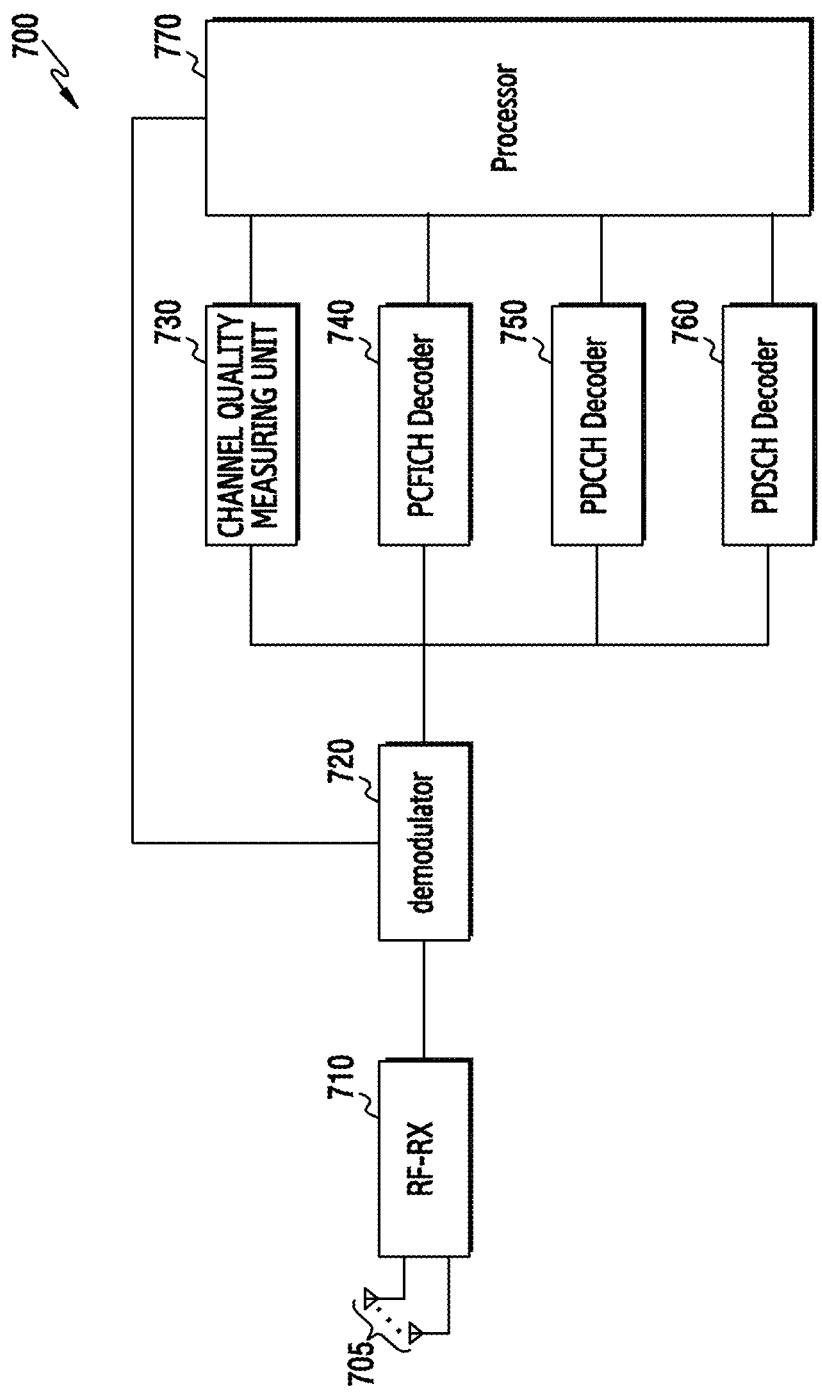
FIG. 7 is a block diagram illustrating a receiver, according to an embodiment of the present disclosure.

FIG. 7 is a block diagram illustrating a receiver, according to an embodiment of the present disclosure.

Referring to FIG. 7, a receiver 700 includes at least one antenna 705, a receiving unit (RF-Rx) 710, a demodulator 720, a channel quality measuring unit 730, a PCFICH decoder 740, a PDCCH decoder 750, a PDSCH decoder 760, and a processor 770.

The at least one antenna 705 may be configured to be suitable for a multiple input multiple output (MIMO) scheme. The at least one antenna 705 may receive signals from the transmitter.

The receiving unit 710 may low-noise-amplify a received RF signal, and then may down-convert the signal to a baseband.

The demodulator 720 may demodulate the received signal, corresponding to the modulation method (e.g., an orthogonal frequency division multiplexing (OFDM) method), and may de-map the demodulated signal to then provide the signal to a corresponding channel decoder.

The demodulator 720 may de-map the demodulated signal, and may provide the de-mapped signal to the channel quality measuring unit 730, the PCFICH decoder 740, the PDCCH decoder 750, or the PDSCH decoder 760, which corresponds to the de-mapped signal.

For example, the demodulator 720 may provide a reference signal included in the received signal to the channel quality measuring unit 730.

The demodulator 720 may provide the PCFICH that is included in the received signal to the PCFICH decoder 740.

The demodulator 720 may demodulate the received signal, and may extract (de-map) the PDCCH. The demodulator 720 may receive CFI information (that has been obtained from the PCFICH decoder 740) from the processor 770. The demodulator 720 may provide the PDCCH to the PDCCH decoder 750, based on the CFI information in the demodulated signal.

The demodulator 720 may extract the PDSCH that is included in the demodulated signal. The demodulator 720 may receive DCI information (that has been obtained from the PDCCH decoder 750) from the processor 770. The demodulator 720 may provide the PDSCH to the PDSCH decoder 760, based on the DCI information.

The channel quality measuring unit 730 may measure the quality of the channel through which the signal is received. The channel quality measurement may encompass SINR measurement, CINR measurement, or RSSI measurement. For example, the channel quality measuring unit 730 may receive a reference signal of the base station from the demodulator 720. The channel quality measuring unit 730 may measure the SINR on the basis of the reference signal. The channel quality measuring unit 730 may provide the measured SINR to the processor 770.

The receiver 700 may include a channel decoder that includes the PCFICH decoder 740, the PDCCH decoder 750, and the PDSCH decoder 760. For example, the channel decoder may be a maximum likelihood (ML) decoder, a viterbi decoder, or a turbo decoder.

The PCFICH decoder 740 may receive the extracted PCFICH from the demodulator 720. The PCFICH decoder 740 may decode the received PCFICH. For example, the PCFICH decoder 740 may select the best CFI k (for example, k=1, 2, or 3) by decoding the received PCFICH. The CFI k may indicate the allocation area of the PDCCH. The PCFICH decoder 740 may perform the matched filtering for each CFI code in order to thereby select the CFI of which the filter output is greatest. For example, when the CFI is 1 (e.g., CFI 1), the PDCCH may be allocated to the first OFDM symbol column in a single subframe. In another example, when the CFI is 3 (e.g., CFI 3), the PDCCHs may be allocated to the first to the third OFDM symbol columns in a single subframe.

The PCFICH decoder 740 may provide the selected (or obtained) CFI information to the PDCCH decoder 750 and/or the processor 770. The PCFICH decoder 740 may be an ML decoder.

The PDCCH decoder 750 may configure the PDCCH area on the basis of the CFI that is decoded by the PCFICH decoder 740, and may decode signals of the configured PDCCH area. For example, as shown in FIG. 3B, when the CFI is 2 (e.g., CFI 2 or CFI=2), the PDCCH allocation area may be the first and the second OFDM symbol columns of FIG. 1. The PDCCH decoder 750 may decode the first and the second OFDM symbol columns.

The PDCCHs of a variety of CCE aggregation levels may be provided. For example, the PDCCHs may include the PDCCHs of the CCE aggregation level 1, 2, 4, and/or 8. The PDCCH decoder 750 may decode the extracted PDCCH. The PDCCH decoder 750 may select and decode the extracted PDCCH for each CCE aggregation level. The PDCCH decoder 750 may determine whether or not the decoding of the PDCCH is successful through a cyclic redundancy check (CRC) unit that is included in the PDCCH decoder 750. The PDCCH decoder 750 may obtain the DCI of the received signal by decoding the PDCCH.

The PDCCH decoder 750 may provide the obtained DCI information to the processor 770. For example, the PDCCH decoder 750 may be a viterbi decoder.

The PDSCH decoder 760 may decode the PDSCH based on the DCI information. The PDSCH decoder 760 may determine whether or not the decoding of the PDSCH is successful through the CRC unit that is included in the PDSCH decoder 760. The PDSCH decoder 760 may decode and output the PDSCH. The PDSCH decoder 760 may be a turbo decoder.

The processor 770 may be implemented as a system on chip (SoC). In addition, if necessary, the processor 770 may be divided and combined with internal configuration elements of the receiver 700 (e.g., the receiving unit 710, the demodulator 720, the channel quality measuring unit 730, the PCFICH decoder 740, the PDCCH decoder 750, or the PDSCH decoder 760) for implementation.

The processor 770 may receive commands of other configuration elements (e.g., the receiving unit 710, the demodulator 720, the channel quality measuring unit 730, the PCFICH decoder 740, the PDCCH decoder 750, or the PDSCH decoder 760), and may interpret the received commands to thereby perform the calculation or data processing according to the interpreted commands.

The processor 770 may include a decoding mode determining unit, a decoding reliability computing unit, and a DCI determining unit.

Figure 8:
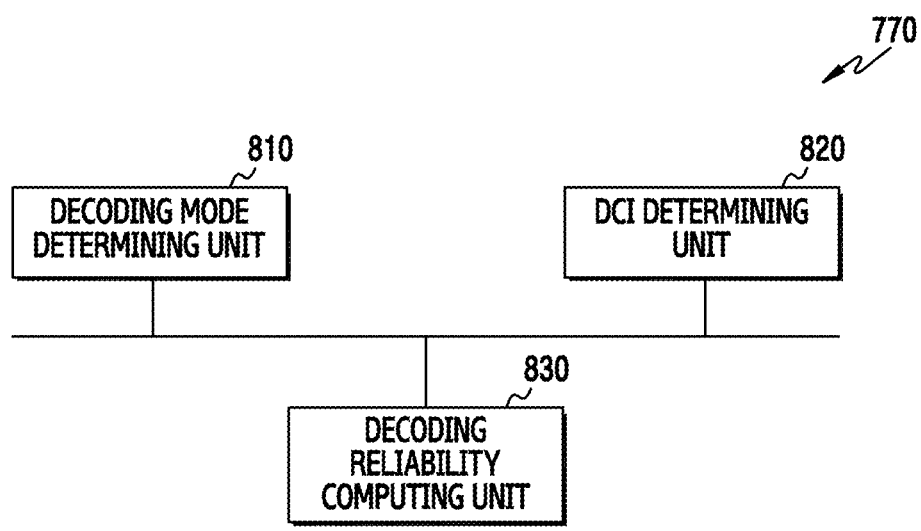
FIG. 8 is a functional block diagram illustrating a processor, according to an embodiment of the present disclosure.

FIG. 8 is a block diagram illustrating a processor, according to an embodiment of the present disclosure. This block configuration may be included in the processor 770 of FIG. 7.

Referring to FIG. 8, the processor 770 includes a decoding mode determining unit 810, a DCI determining unit 820, and a decoding reliability computing unit 830.

The decoding mode determining unit 810 may determine a decoding mode according to the channel quality.

The decoding mode determining unit 810 may receive the channel quality from the channel quality measuring unit 730 of FIG. 7. The channel quality may be a value that is based on the SINR, the CINR, and/or the RSSI. The decoding mode determining unit 810 may compare the received channel quality with a configuration condition in order to determine the decoding mode. The configuration condition may be pre-configured or pre-defined in the receiver 700.

For example, if the channel quality is the configuration condition, the decoding mode determining unit 810 may determine the decoding mode as the first decoding mode. The first decoding mode may be used when the reception channel quality is good. In the first decoding mode, the CFI may be obtained through the PCFICH decoding, the DCI may be obtained by decoding the PDCCH through the CFI, and the PDSCH is decoded through the DCI.

Alternatively, if the channel quality is not the configuration condition, the decoding mode determining unit 810 may determine the decoding mode as the second decoding mode. The second decoding mode may be used when the reception channel quality is poor (for example, in the case where the channel quality value is less than a threshold value). In the second decoding mode, the PDCCH and/or the PDSCH may be decoded without using the CFI that is obtained through the PCFICH based on the poor reception channel quality.

The decoding mode determining unit 810 may measure the reception channel quality without using the channel quality measuring unit 730. The decoding mode determining unit 810 may measure the reception channel quality by using an output of the PCFICH decoder 740 of FIG. 7. The output of the PCFICH decoder 740 may be a maximum value and a minimum value of the output of the matched filter that is included in the PCFICH decoder 740. The maximum value of the output of the matched filter may be a maximum value of the CFI, which is obtained through the decoding of the PCFICH, and the minimum value of the output of the matched filter may be a minimum value of the CFI, which is obtained through the decoding of the PCFICH. The decoding mode determining unit 810 may compare a difference between the maximum value and the minimum value with the configuration condition in order to thereby determine the decoding mode because a relatively little difference between the maximum value and the minimum value may mean that the reception channel quality is poor. For example, if a difference between the maximum value and the minimum value is the configuration condition, the decoding mode determining unit 810 may determine the decoding mode as the first decoding mode. If a difference between the maximum value and the minimum value is not the configuration condition, the decoding mode determining unit 810 may determine the decoding mode as the second decoding mode. The decoding mode determining unit 810 may use the CFI of a second greatest value instead of the minimum value in the process (or procedure) above.

The DCI determining unit 820 may receive a decoding result for the completion of the CRC inspection from the PDCCH decoder 750, and determine the DCI. For example, the PDCCH decoder 750 may decode the PDCCH data based on the first decoding mode, and if the decoding result of the PDCCH is determined to be "CRC good," the DCI determining unit 820 may determine a decoding result value of the PDCCH decoder 750 as the DCI.

When the PDCCH decoder 750 performs decoding according to the second decoding mode, the DCI determining unit 820 may determine the DCI according to the operation below.

If there is no successful decoding result according to the CRC inspection result, the DCI determining unit 820 may determine that the decoding has failed. If there is one successful decoding result according to the CRC inspection result, the DCI determining unit 820 may determine the DCI based on the decoding result. If there are two or more successful decoding results according to the CRC inspection result, the DCI determining unit 820 may provide the successful decoding results to the decoding reliability computing unit 830.

The DCI determining unit 820 may receive information on the most reliable decoding result from the decoding reliability computing unit 830.

The DCI determining unit 820 may determine the CFI based on the most reliable decoding result. For example, when the PDCCH decoder decodes the PDCCHs of all of the CCE aggregation levels, the DCI determining unit 820 may omit the operation of determining the CFI. When the PDCCH decoder decodes the PDCCH of CCE aggregation level 8, the DCI determining unit 820 may perform the operation of determining the CFI. The DCI determining unit 820 may determine the CFI corresponding to the decoding result that has a highest reliability as the CFI of the received signal. The DCI determining unit 820 may provide the determined CFI information to the demodulator 720 and/or the PDCCH decoder 750. The PDCCH decoder 750 may configure the area of the PDCCH based on the determined CFI information. The PDCCH decoder 750 may decode the data of the remaining CCE aggregation levels except for the PDCCH of the CCE aggregation level 8 in the configured PDCCH area. The PDCCH decoder 750 may provide the PDCCH decoding result of the remaining CCE aggregation levels to the DCI determining unit 820. The DCI determining unit 820 may determine the DCI based on the received PDCCH decoding result of the remaining CCE aggregation levels and the PDCCH decoding result of the CCE aggregation level 8. The DCI determining unit 820 may provide the DCI information to the processor 770. The processor 770 may analyze the DCI information and may provide the analyzed information to the PDSCH decoder. The PDSCH decoder 760 may decode the received PDSCH data.

The decoding reliability computing unit 830 may calculate the reliability of the decoding according to the CRC inspection result. The calculation of the decoding reliability may be operated as described below.

The decoding reliability computing unit 830 may calculate the reliability of the successful decoding. The calculation of the decoding reliability may use the likelihood metric method or the soft correlation metric (SCM) method. When the decoding reliability computing unit 830 operates according to the likelihood metric method, the decoding reliability computing unit 830 may calculate the decoding reliability by a log value (i.e., a log likelihood ratio (LLR) value) for a ratio of the probability in which the PDCCH is decoded when the base station transmits the PDCCH to the probability in which the PDCCH is detected when the base station does not transmit the PDCCH. When the decoding reliability computing unit 830 operates according to the SCM, the decoding reliability computing unit 830 may create a code sequence of {1, −1} by re-encoding the demodulated PDCCH. After that, the decoding reliability computing unit 830 may calculate the reliability of the decoding through the relationship between the code sequence and a code sequence of the received signal (that is, a code sequence mixed with noise). The detailed example of the Likelihood metric or the SCM (soft correlation metric) may be supported by Reference 1 (D. Bai, J. Lee, S. Kim, and I. Kang, "Systematic pruning of blind decoding results," in conf. Rec. of the A silomar Conference on Signals, Systems and Computers, pp. 153-157, November 2012), and Reference 2 (D. Doan, K. Seong, and H. Bagheri, "Method and apparatus for reliability aided pruning of blind decoding results," US Patent Application, Publication No. US2011/0182385 A1, July 2011).

The decoding reliability computing unit 830 may determine the decoding that has a highest reliability among the calculated reliabilities of the decoding. The decoding reliability computing unit 830 may provide information on the decoding of the highest reliability that is determined above to the DCI determining unit 820. As described above, the DCI determining unit 820 may determine the CFI based on the information on the decoding of the highest reliability. The CFI may be the information for determining the PDCCH area, which has the DCI information, as described above.

A receiving device (e.g., the receiver 700 of FIG. 7), according to an embodiment of the present disclosure, may decode the PDCCH data without being limited to the PCFICH error performance. The receiving device may decode the channel information or the PCFICH data. In addition, the receiving device may decode the PDCCH data with respect to the additional CFI value. In addition, the receiving device may decode only the PDCCH data of some CFI aggregation levels when decoding the PDCCH data with respect to the additional CFI value. The receiving device may select an optimal CFI by using the reliability metric of the PDCCH that is decoded with respect to the additional CFI value. The receiving device may further decode the PDCCH or may select the decoded PDCCH, for the selected CFI.

As described above, in order to find the boundary between the control channel to which the PDSCH is allocated and the data channel to which the PDCCH is allocated for each subframe in the LTE downlink, the receiving device (e.g., the receiver 700 of FIG. 7) may decode the PCFICH to figure out the CFI value. The receiving device may de-allocate and decode the PDCCH signal in the OFDM symbol column to which the channel is allocated by using the CFI value in order to thereby obtain the DCI. The CFI value may indicate the start of the PDSCH signal (start OFDM symbol), and the DCI may include allocation information that includes the number and the positions of the RBs of the PDSCH. In general, through the operation above, the receiving device may obtain subframe allocation information of the PDSCH, and may decode the PDSCH signal. However, if the PCFICH decoding performance is lower than the transmitted PDCCH, for example, if the decoding error rate of the PCFICH is greater than the PDCCH, a PCFICH decoding error may occur, resulting in a failure to decode the PDCCH.

The receiving device, according to an embodiment of the present disclosure, may prevent the decoding performance of the PDCCH or PDSCH from being limited to the decoding performance of the PCFICH when the decoding performance of the PCFICH is lower than the decoding performance of the PDCCH or PDSCH. The receiving device may decode the PDCCH data without being limited to the decoding performance of the PCFICH. The receiving device may decode the PDCCH data for an additional CFI value with reference to the channel information or an output of the PCFICH decoder (matched filter output). In addition, the receiving device may decode only some of the aggregation levels when decoding the PDCCH for the additional CFI value. The receiving device may select an optimal CFI by using the reliability metric of the PDCCH that is decoded with respect to the additional CFI value. The receiving device may further decode the PDCCH or may select the decoded PDCCH, for the selected CFI.

Figure 9:
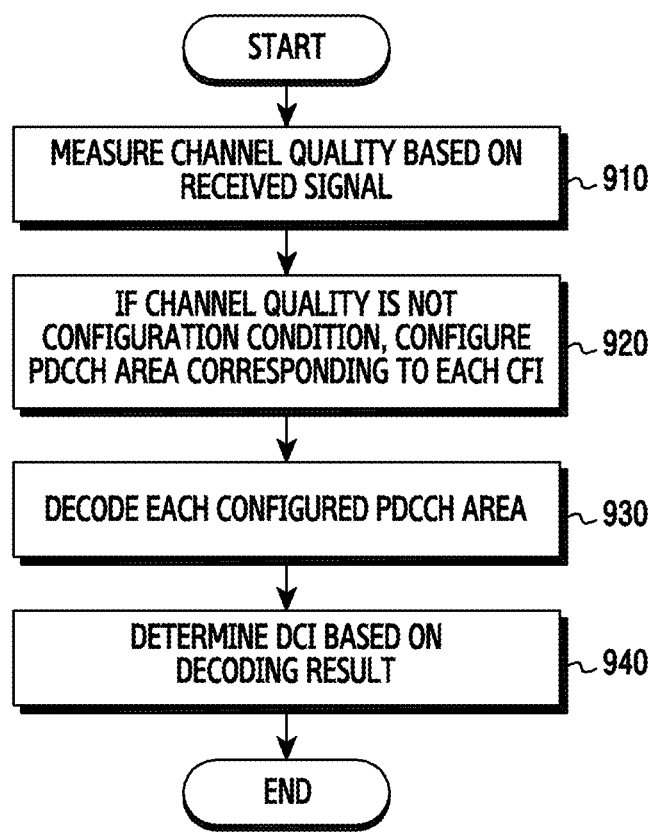
FIG. 9 is a flowchart illustrating an operation of the receiver, according to an embodiment of the present disclosure.

FIG. 9 is a flowchart illustrating an operation of the receiver, according to an embodiment of the present disclosure. This operation may be performed by the receiver 700 of FIG. 7.

Referring to FIG. 9, in step 910, the receiver 700 measures the channel quality based on the received signal. For example, the channel quality may be a difference between a maximum value and a minimum value of the decoder output of the SINR, the CINR, the RSSI, or the PCFICH. The measured channel quality may be used as a basis for determining the decoding mode of the receiver 700.

In step 920, if the measured channel quality is not a configuration condition, the receiver 700 configures the PDCCH area corresponding to each CFI. The configuration condition may be pre-configured or pre-defined in the receiver 700. The configuration condition may be a criterion for determining whether or not the reception channel quality is good. If it is determined that the channel quality is poor, the receiver 700 may configure each PDCCH area according to the CFI value (for example, CFI=1, 2, or 3). For example, if the CFI value is 1, the receiver 700 configures the area corresponding to one symbol, as shown in FIG. 3A, as the PDCCH area. If the CFI value is 2, the receiver 700 configures the area corresponding to two symbols, as shown in FIG. 3B, as the PDCCH area. If the CFI value is 3, the receiver 700 configures the area corresponding to three symbols, as shown in FIG. 3C, as the PDCCH area.

In step 930, the receiver 700 decodes each PDCCH area configured in step 920. The receiver 700 may decode the PDCCH signal that is configured according to the CFI value in a single subframe. For example, if the CFI is 1, the receiver 700 decodes the PDCCH signal of the first OFDM symbol column. If the CFI is 2, the receiver 700 decodes the PDCCH signals of the first and the second OFDM symbol columns. If the CFI is 3, the receiver 700 decodes the PDCCH signals of the first, the second, and the third OFDM symbol columns. The decoding may be selectively performed according to the CCE aggregation level. For example, the receiver 700 may decode only the PDCCH of CCE aggregation level 8 included in each configured PDCCH area.

In step 940, the receiver 700 determines the DCI based on the decoding result. If the decoding is completed for the PDCCHs of all of the CCE aggregation levels, the receiver 700 may determine the DCI based on the decoding result. If the decoding is completed for the PDCCHs of some of the CCE aggregation levels, the receiver 700 may determine the DCI based on the decoding result. The determination of the CFI, if necessary (for example, if two or more decoding results are determined to be successful as a result of the CRC inspection), may be carried out through the operation of calculating the decoding reliability. The receiver 700 may decode the PDCCHs of the remaining CCE aggregation levels based on the determined CFI. The receiver 700 may determine the DCI based on the result of the decoding.

The receiver 700, according to an embodiment of the present disclosure, may succeed in decoding the PDCCH to thereby obtain (or determine) the DCI even when the reception channel quality is poor. The receiver 700, according to an embodiment of the present disclosure, may succeed in decoding the PDSCH, based on the obtained (or determined) DCI.

Figure 10:
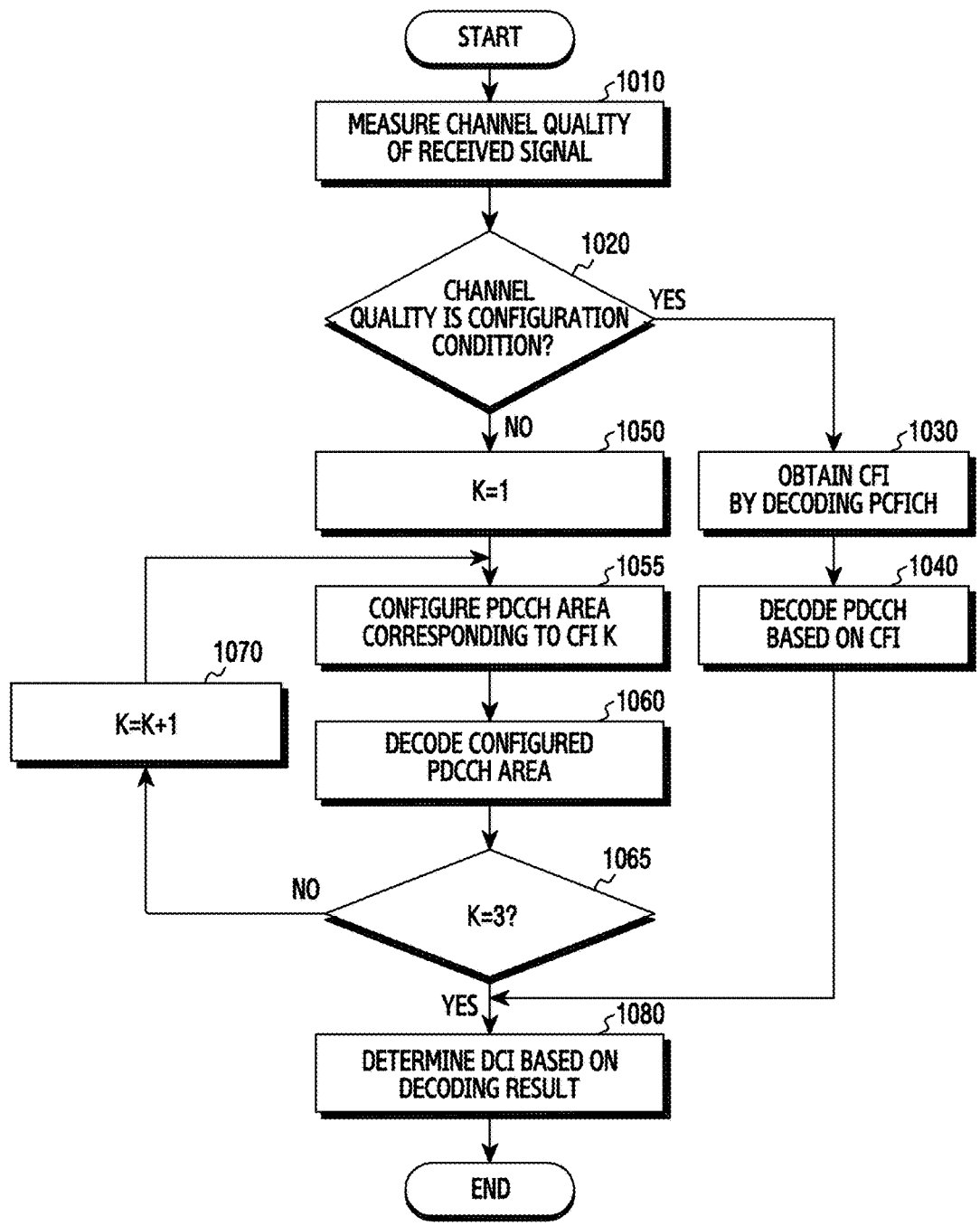
FIG. 10 is a flowchart illustrating an operation of performing a first decoding mode and a second decoding mode at the receiver, according to an embodiment of the present disclosure.

FIG. 10 is a flowchart illustrating an operation of preforming the first decoding mode and the second decoding mode at the receiver, according to an embodiment of the present disclosure. This operation may be performed by the receiver 700 of FIG. 7.

Referring to FIG. 10, in step 1010, the receiver 700 measures the channel quality of the received signal. Step 1010 may correspond to step 910 shown of FIG. 9.

In step 1020, the receiver 700 determines whether the channel quality measured in step 1010 is a configuration condition. If the channel quality is not the configuration condition, it may mean that the reception channel quality is poor. If the channel quality is the configuration condition, it may mean that the reception channel quality is good. If the channel quality is the configuration condition, the receiver 700 may determine the decoding mode as the first decoding mode. If the channel quality is not the configuration condition, the receiver 700 may determine the decoding mode as the second decoding mode.

When it is determined that the channel quality is the configuration condition, the receiver 700 extracts or obtains the PCFICH from the received signal, in step 1030. The receiver 700 may obtain the CFI by decoding the extracted PCFICH. The CFI may include the information on the allocation area of the PDCCH.

In step 1040, the receiver 700 decodes the PDCCH based on the CFI. The receiver 700 may configure the area of the PDCCH corresponding to the CFI. The receiver 700 may extract the PDCCH in the configured PDCCH area. The receiver 700 may decode the extracted PDCCH. The receiver then proceeds to step 1080.

Steps 1030 and 1040 may refer to the operation of the receiver 700 according to the first decoding mode.

If the channel quality is not the configuration condition in step 1020, the receiver 700 initializes the value of k (the CFI value of the reception signal) as 1 to configure the second decoding mode. CFI=1 (or CFI 1) may mean that the PDCCH is allocated to the first OFDM symbol.

In step 1055, the receiver 700 configures the PDCCH area corresponding to CFI k. For example, in the case of k=1 (that is, in the case of CFI=1 or CFI 1), the receiver 700 configures the PDCCH area to be the first OFDM symbol. In the case of k=2, the receiver 700 configures the PDCCH area up to the second OFDM symbol. In the case of k=3, the receiver 700 configures the PDCCH area up to the third OFDM symbol.

In step 1060, the receiver 700 decodes each of the configured PDCCH areas. The decoding, if necessary, may be performed with respect to the PDCCHs of some of the CCE aggregation levels. For example, the receiver 700 may decode the PDCCH of the CCE aggregation level 8 according to each configured PDCCH area.

In step 1065, the receiver 700 determines whether k=3 (that is, whether or not k has reached 3). When 'k=3', the PDCCH area is configured for all of the CFI values, and the decoding of the PDCCH is completed.

If the receiver 700 determines that k has not reached 3, the receiver 700 increases the value k by one, in step 1070, and then returns to step 1055. The receiver 700 may increase the value k by one in order to change the CFI value.

If the receiver 700 determines that k is equal to 3 (that is, when the decoding of the PDCCH areas corresponding to all of the CFIs is completed), the receiver 700 determines the DCI based on the decoding result, in step 1080. If the PDCCHs of all of the CCE aggregation levels are decoded in step 1060, the receiver 700 may determine the DCI based on the decoding result. If only the PDCCHs of some of the CCE aggregation levels are decoded in step 1060, the receiver 700 may determine the DCI based on the decoding result. If necessary, the operation of determining the CFI may include the operation of calculating the reliability of the decoding result. Based on the determined CFI, the receiver 700 may decode the PDCCHs of some of the CCE aggregation levels among the PDCCHs of all the CCE aggregation levels. The receiver 700 may determine the DCI based on the decoding result of the PDCCHs of some of the CCE aggregation levels and the decoding result of the PDCCHs of the remaining CCE aggregation levels.

The receiver 700 may decode the PDSCH based on the determined DCI. The receiver 700 may source-decode the decoding result of the PDSCH in order to thereby use the data thereof.

The receiver 700, according to an embodiment of the present disclosure, may change the decoding mode to then decode the signal when the reception channel quality is poor. The receiver 700, according to an embodiment of the present disclosure, may succeed in decoding the PDCCH and/or PDSCH even when the reception channel quality is poor.

Figure 11:
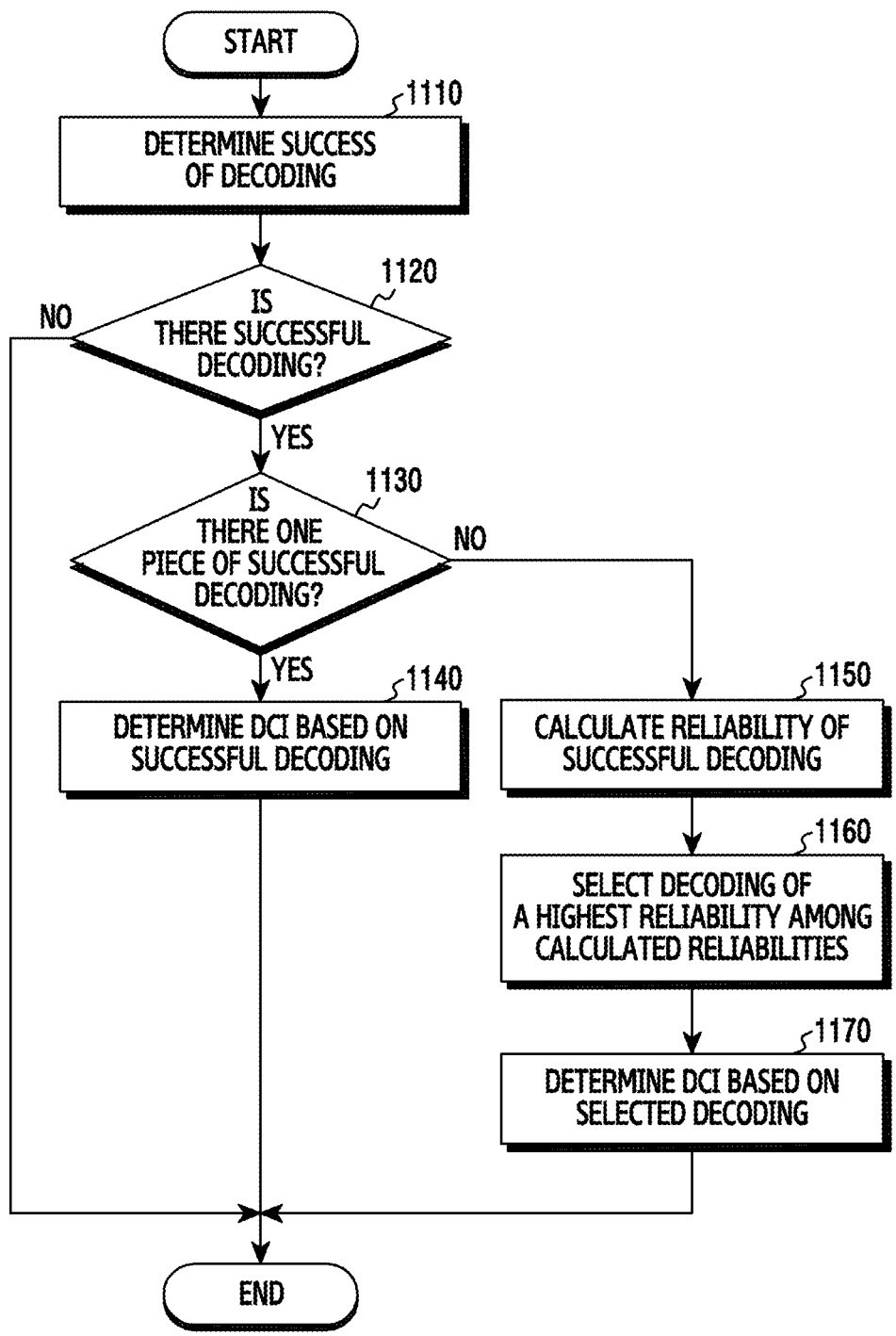
FIG. 11 is a flowchart illustrating an operation of determining a DCI at the receiver, according to an embodiment of the present disclosure.

FIG. 11 is a flowchart illustrating an operation of determining the DCI at the receiver, according to an embodiment of the present disclosure. This operation may be performed by the receiver 700 of FIG. 7.

Referring to FIG. 11, in step 1110, the receiver 700 determines whether each decoding is successful. The decoding may refer to the decoding of the PDCCH area that is configured to correspond to each CFI. The decoding may include the decoding of the PDCCHs of some of the CCE aggregation levels.

In step 1120, the receiver 700 determines whether there is a successful decoding. If there is not a successful decoding, the receiver 700 terminates the procedure of FIG. 11.

If there is a successful decoding, the receiver 700 determines whether there is a single successful decoding result, in step 1130.

If there is a single successful decoding result, the receiver 700 determines the DCI based on the single successful decoding result, in step 1140. If the receiver 700 decodes the PDCCHs of all the CCE aggregation levels in the previous operation of FIG. 11, the receiver 700 may determine the DCI based on the single successful decoding result. If the receiver 700 decodes the PDCCHs of some of the CCE aggregation levels in the previous operation of FIG. 11, the receiver 700 may determine the DCI based on the single successful decoding result. The receiver 700 may decode the PDCCHs of the remaining CCE aggregation levels, based on the determined CFI. The receiver 700 may determine the DCI based on the decoding result of all of the CCE aggregation levels (because the PDCCHs of the remaining CCE aggregation levels have been decoded).

If there is not a single successful decoding result (i.e., there are two or more successful decoding results), the receiver 700 calculates the reliabilities of the plurality of successful decoding results, in step 1150. The calculation of the reliabilities of the plurality of successful decoding results may be made by the likelihood metric or the SCM. When the receiver 700 operates according to the Likelihood metric, the receiver 700 may calculate the reliability by a log value (i.e., a LLR value) of a ratio of the probability in which the PDCCH is decoded when the base station transmits the PDCCH to the probability in which the PDCCH is detected when the base station does not transmit the PDCCH. When the receiver 700 operates according to the SCM, the receiver 700 may create a code sequence of {1, −1} by re-encoding the demodulated PDCCH. The receiver 700 may calculate a correlation value between the code sequence and a code sequence mixed with noise of the received signal as the reliability.

In step 1160, the receiver selects the decoding that has a highest reliability among the calculated reliabilities.

In step 1170, the receiver 700 determines DCI based on the selected decoding. If the receiver 700 decodes the PDCCHs of all of the CCE aggregation levels in the previous step of FIG. 11, the receiver 700 may determine the DCI based on the selected decoding result. If the receiver 700 decodes the PDCCHs of some of the CCE aggregation levels in the previous step of FIG. 11, the receiver 700 may determine the DCI based on the selected decoding result. The receiver 700 may decode the PDCCHs of the remaining CCE aggregation levels except for the PDCCHs of some of the CCE aggregation levels among the PDCCHs of all of the CCE aggregation levels, based on the determined CFI. The receiver 700 may determine the DCI based on the decoding result of all of the CCE aggregation levels (because the PDCCHs of the remaining CCE aggregation levels have been decoded).

Figure 12:
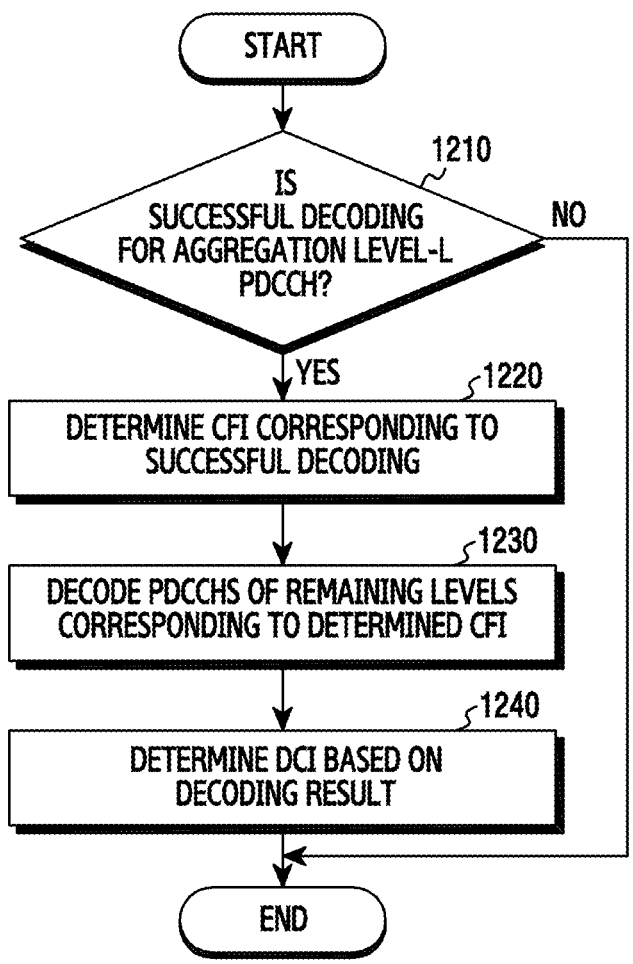
FIG. 12 is a flowchart illustrating an operation of determining a DCI at the receiver, according to an embodiment of the present disclosure.

FIG. 12 is a flowchart illustrating an operation of determining a DCI at the receiver, according to an embodiment of the present disclosure. This operation may be performed by the receiver 700 of FIG. 7.

Referring to FIG. 12, in step 1210, the receiver 700 determines whether the successful decoding is the decoding for the PDCCHs of all of the CCE aggregation levels. If the successful decoding is not the decoding for the PDCCHs of all of the CCE aggregation levels, the receiver 700 terminates the operation of FIG. 12.

If the successful decoding is the decoding for the PDCCHs of all of the CCE aggregation levels, the receiver 700 determines the CFI corresponding to the successful decoding, in step 1220. If there is one successful decoding result, the receiver 700 may determine the CFI of the successful decoding area as the CFI of the reception signal. For example, if the successful decoding corresponds to the decoding of the PDCCH area of up to the second OFDM symbol area, the receiver 700 may determine the CFI to be 2. If there is a plurality of successful decoding results, the receiver 700 may perform operations 1150 to 1160 of FIG. 11 in order to select the most reliable decoding. The receiver 700 may determine the CFI of the selected decoding area of the highest reliability to be the CFI of the reception signal.

In step 1230, the receiver 700 decodes the PDCCHs of the remaining CCE aggregation levels corresponding to the determined CFI.

In step 1240, the receiver 700 determines the DCI based on the decoding result. The decoding result may refer to the decoding results of all the PDCCHs.

The receiver 700 may extract the PDSCH based on the determined DCI. The receiver 700 may decode the extracted PDSCH.

As described above, the receiver 700 may decode the PCFICH in order to thereby select the best CFI k ($\in$ {1, 2, 3}). That is, the PCFICH decoder (ML decoder) 740 may perform the matched filtering of each CFI code, and may select the CFI of a largest filter output. The receiver 700 may calculate the PDCCH allocation area based on the CFI k, and may extract and decode the PDCCH signal.

However, if the receiver 700 belongs to an area where the PCFICH error rate is to be considered (in the case of an unfavorable channel environment), the receiver 700, according to an embodiment of the present disclosure, may decode the PDCCH for another CFI. The determination of whether the additional PDCCH decoding for another CFI is performed may be made by determining whether a difference between a maximum value and a minimum value (or a second maximum value) of the PCFICH (for example, the PCFICH matched filter) output is less than or equal to a predetermined threshold value. This condition may be used in conjunction with the SINR condition. In order to reduce the decoding time when decoding the PDCCH for the additional CFI, the receiver 700 may decode only the PDCCH of the CCE aggregation level 8, or may decode the PDCCHs of the CCE aggregation level 8 and the CCE aggregation level 4. If there is a CFI that has not been checked in this way, the receiver 700 may decode the PDCCH of a new CFI in the same way.

Finally, when one or more PDCCHs for different CFIs are decoded, the receiver 700 may select one CFI and the PDCCH corresponding thereto. First, the receiver 700 may assume that the maximum value of the reliability of the PDCCH that is detected for each CFI k is $P_k$. In addition, the likelihood metric or the SCM may be used for the reliability metric. Next, the receiver 700 may select a largest value among the $P_k$ values that represent each CFI k. Afterwards, the receiver 700 may select the CFI k according to the selected $P_k$, and may obtain the DCI information from the decoded PDCCHs on the assumption of the CFI.

Figure 13:
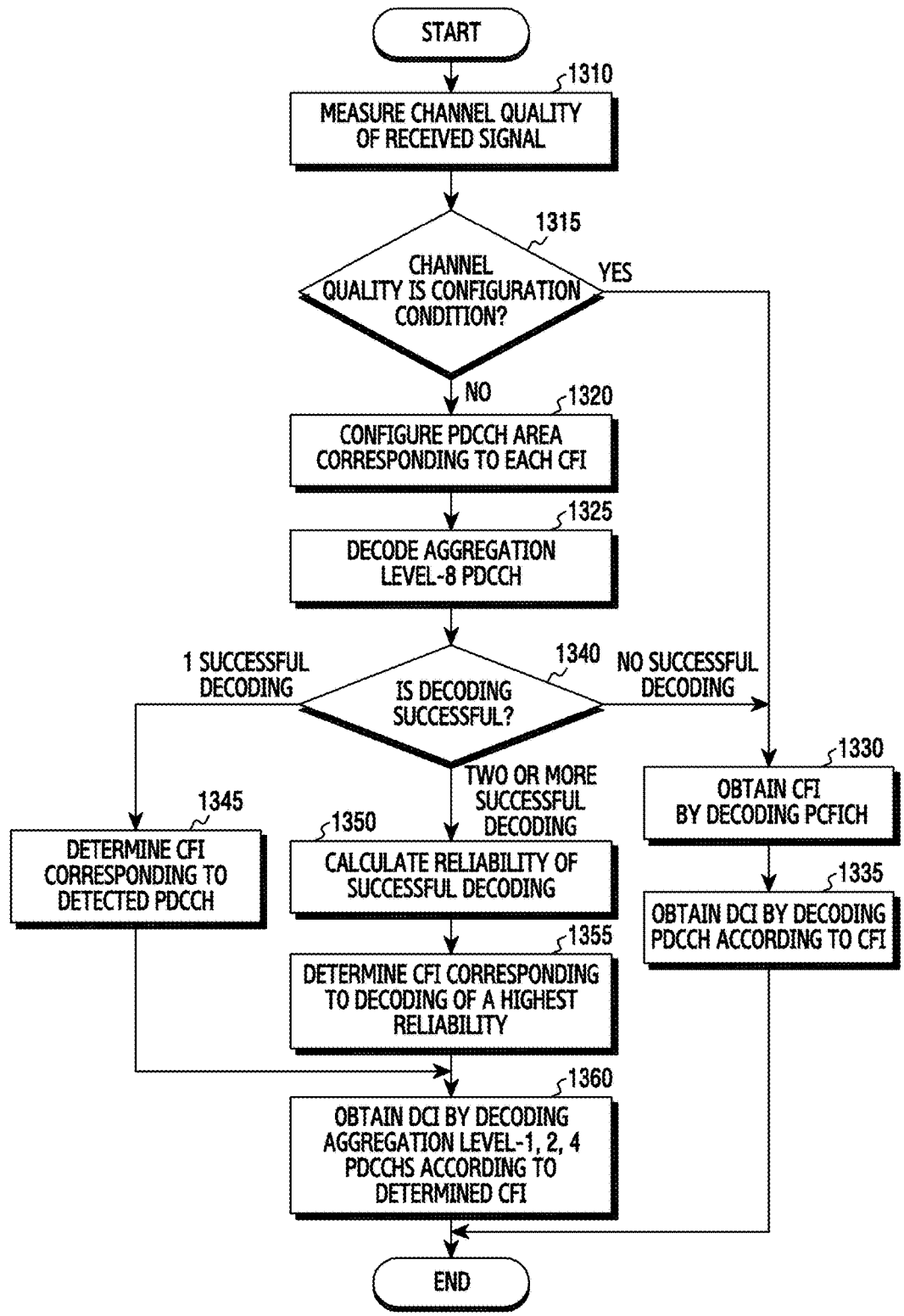
FIG. 13 is a flowchart illustrating an operation of performing a first decoding mode and a second decoding mode at the receiver, according to an embodiment of the present disclosure.

FIG. 13 is a flowchart illustrating an operation of performing the first decoding mode and the second decoding mode at the receiver, according to an embodiment of the present disclosure. This operation may be performed by the receiver 700 of FIG. 7.

Referring to FIG. 13, in step 1310, the receiver 700 measures the channel quality of the reception signal. For example, the receiver 700 may measure the channel quality through the RSSI, the SINR, or the CINR of the reception signal. The receiver 700 may measure the channel quality, based on the decoding result of the PCFICH included in the reception signal as well. For example, the receiver 700 may measure the channel quality through a difference between a maximum value and a minimum value (or a second largest value) of a decoded output of the PCFICH.

In step 1315, the receiver 700 determines whether the channel quality is the configuration condition. If the channel quality is not the configuration condition (that is, when it is determined that the channel quality is poor), the receiver 700 continues to step 1320. If the channel quality is the configuration condition (that is, when it is determined that the channel quality is good), the receiver 700 continues to step 1330.

In step 1320, the receiver 700 configures the PDCCH area corresponding to each CFI. For example, if the CFI is 1, the receiver 700 may configure the area of up to the first OFDM symbol as the PDCCH area. If the CFI is 2, the receiver 700 may configure the area of up to the second OFDM symbol as the PDCCH area. If the CFI is 3, the receiver 700 may configure the area of up to the third OFDM symbol as the PDCCH area.

In step 1325, the receiver 700 may decode the PDCCH of the CCE aggregation level 8. In this embodiment of the present disclosure, the receiver 700 may decode only the PDCCH of the CCE aggregation level 8 because the PDCCH of the CCE aggregation level 8 may have a highest reliability among the PDCCHs of all of the CCE aggregation levels when the reception channel is poor.

With respect to good reception quality, in step 1330, the receiver 700 obtains the CFI by decoding the PCFICH.

In step 1335, the receiver 700 obtains the DCI by decoding the PDCCH according to the CFI, after which the receiver terminates the methodology.

In step 1340, the receiver 700 determines whether the decoding is successful, and the number of successful decoding results.

If there is one successful decoding result, the receiver 700 determines the CFI corresponding to the detected PDCCH, in step 1345. For example, if the area of up to the third OFDM symbol is determined to be the PDCCH area, the receiver 700 may determine the CFI to be 3. The receiver then proceeds to step 1360.

If there are a plurality (two or more) of successful decoding results, the receiver 700 calculates the reliability for the decoding. The calculation of the reliability may be made by using the likelihood metric or the SCM.

In step 1355, the receiver 700 determines the decoding that has a highest reliability. The receiver 700 may determine the CFI corresponding to the decoding of the highest reliability as the CFI of the reception signal.

In step 1360, the receiver 700 decodes the PDCCHs of the CCE aggregation levels 1, 2, and 4 based on the CFI that is determined in step 1345 and step 1355. The receiver 700 may determine the DCI based on the decoding result of the PDCCH of the CCE aggregation level 8 and the decoding results of the PDCCHs of the CCE aggregation levels 1, 2, and 4.

If there is no successful decoding result, the receiver 700 proceeds to step 1330, as described above.

The receiver 700 may extract the PDSCH from the reception signal based on the determined DCI. The receiver 700 may decode the extracted PDSCH.

The receiver 700, according to an embodiment of the present disclosure, may succeed in decoding the PDCCH and the PDSCH when the reception channel quality is poor. The receiver 700 may succeed in decoding the PDCCH and the PDSCH without relying on the PCFICH decoding success rate.

Figure 14:
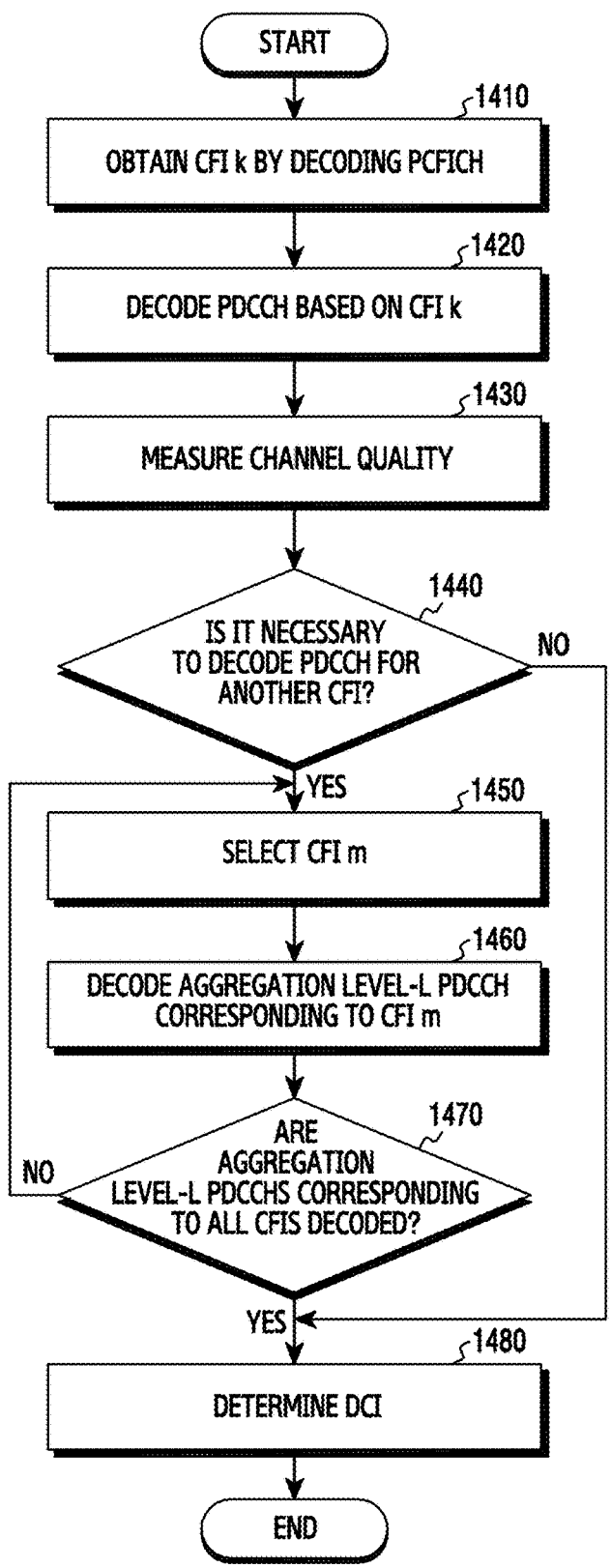
FIG. 14 is a flowchart illustrating a decoding operation of the receiver, according to an embodiment of the present disclosure.

FIG. 14 is a flowchart illustrating a decoding operation of the receiver, according to an embodiment of the present disclosure. This operation may be performed by the receiver 700 of FIG. 7.

Referring to FIG. 14, in step 1410, the receiver 700 obtains the CFI k by decoding the PCFICH. The CFI k may be a value of a maximum output among the decoding outputs of the PCFICH.

In step 1420, the receiver 700 decodes the PDCCH based on the CFI k.

In step 1430, the receiver 700 measures the reception channel quality.

The receiver 700, after performing step 1430, may perform steps 1410 and 1420 (or vice versa). Alternatively, the receiver 700 may perform step 1430 together with step 1410 and 1420.

In step 1440, the receiver 700 determines whether it is necessary to decode the PDCCH for another CFI. The determination of the necessity of the PDCCH decoding may be based on the channel quality measured in step 1430. Alternatively, the determination of the necessity of the PDCCH decoding may be made according to the CFI k that is obtained through steps 1410 and 1420. If it is determined that it is necessary to decode PDCCH for another CFI (i.e., the channel quality is poor), the receiver 700 performs 1450. If it is determined that it is not necessary to decode PDCCH for another CFI (i.e., the channel quality is good), the receiver 700 performs step 1480.

In step 1450, the receiver 700 selects the CFI m. 'm' may be a different value from 'k' above. That is, the CFI m may mean the CFIs other than the obtained CFI k.

In step 1460, the receiver 700 decodes the PDCCH of the aggregation level-L corresponding to CFI m. 'L' denotes the number of an aggregation level, which may be one of 1, 2, 4, or 8. For example, the receiver 700 may decode the PDCCH of the aggregation level-8 corresponding to the CFI m. Although the PDCCH of one level is decoded in FIG. 14, if necessary, the receiver 700 may decode the PDCCHs of a plurality of levels.

In step 1470, the receiver 700 determines whether the PDCCHs of the aggregation level-L corresponding to all of the CFIs have been decoded. If the PDCCHs of the aggregation level-L corresponding to all of the CFIs have been decoded, the receiver 700 performs 1480. If the PDCCHs of the aggregation level-L corresponding to all of the CFIs have not been decoded (that is, when the decoding of the PDCCHs of the aggregation level-L corresponding to some of the CFIs has not made), the receiver 700 returns to step 1450.

In step 1480, the receiver 700 determines the DCI. More specifically, when the channel status is good, the receiver 700 may determine the DCI by using the decoding result of the PDCCH based on the CFI k value. When the channel status is poor, the receiver 700 may determine the DCI through the steps of FIG. 11 and/or FIG. 12.

As described above, if it is determined that it is necessary to decode the PDCCHs for multiple CFIs, the receiver 700 may perform the decoding for all of the CFIs with respect to only the CCE aggregation level 8. If no PDCCH has been decoded, the receiver 700 may decode the PDCCHs of the remaining CCE aggregation levels for the optimal CFI k that was selected at the beginning. On the contrary, if a certain PDCCH has been decoded, the receiver 700 may select the maximum value $P_m$ of the likelihood metric or the SCM of the corresponding PDCCH for each CFI m. If no PDCCH has been decoded with respect to the CFI, the receiver 700 may determine the reliability value for the CFI to be a minimum value thereof.

The receiver 700 may then select a maximum value among the $P_m$ values that represent each CFI m. In addition, the receiver 700 may select the CFI m according to the selected $P_m$, and may decode the PDCCHs of the remaining CCE aggregation levels on the assumption of the CFI.

Methods, according to embodiments of the present disclosure, may be implemented in the form of hardware, software, or a combination thereof.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods, according to embodiments of the present disclosure, as disclosed herein.

The programs (software modules or software) may be stored in non-volatile memories including a random access memory (RAM) and a flash memory, a read only memory (ROM), an electrically erasable programmable ROM (EE-PROM), a magnetic disc storage device, a compact disc-ROM (CD-ROM), a digital versatile disc (DVD), or other type optical storage devices, or a magnetic cassette. Alternatively, any combination of some or all of the memories above may form a memory in which the program is stored. Further, a plurality of such memories may be included in the electronic device.

In addition, the programs may be stored in an attachable storage device that may access the electronic device through communication networks such as, for example, the Internet, intranet, local area network (LAN), wireless LAN (WLAN), and storage area network (SAN), or a combination thereof. Such a storage device may access the electronic device via an external port. Further, a separate storage device on the communication network may access a portable electronic device.

Elements included in embodiments of the present disclosure described above are expressed in singular or plural forms according to the proposed specific embodiments. However, the singular form or plural form is selected for convenience of description suitable for the presented situation, and embodiments of the present disclosure are not limited to a single element or multiple elements thereof. Further, either multiple elements expressed in the description may be configured into a single element or a single element in the description may be configured into multiple elements.

The present disclosure may be utilized in conjunction with the manufacture of integrated circuits, chip sets, or SoCs. One skilled in the art would know how to dice wafers and package die to produce integrated circuits. Integrated circuits so manufactured are considered part of this disclosure.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A method of determining a downlink control indicator (DCI) at a receiver, the method comprising:
    receiving a signal at the receiver from a transmitter;
    measuring, by the receiver, channel quality based on the received signal;
    if a measurement of the channel quality is not a configuration condition based on having a value less than a threshold value, decoding, by the receiver, signals of each of physical downlink control channel (PDCCH) areas, in the received signal, indicated by configurable values of a channel format indicator (CFI);
    if the measurement of the channel quality is the configuration condition based on having a value greater than or equal to a threshold value, obtaining, by the receiver, a value of the CFI by decoding a physical control format indicator channel (PCFICH) of the received signal, and decoding, by the receiver, signals of a PDCCH area indicated by the obtained value of the CFI; and
    determining, by the receiver, the DCI based on the decoded signals.

2. The method of claim 1, further comprising decoding a physical downlink shared channel (PDSCH) based on the DCI.

3. The method of claim 1, wherein measuring the channel quality comprises measuring a signal to interference and noise ratio (SINR) based on the received signal.

4. The method of claim 1, wherein measuring the channel quality of the received signal comprises:
    obtaining a maximum value and a minimum value of the decoded PCFICH of the received signal; and
    measuring the channel quality based on a difference between the maximum value and the minimum value.

5. The method of claim 1, wherein determining the DCI comprises:
    determining whether decoding of the signals of each of the PDCCH areas is successful; and
    if it is determined that there is a single successful decoding, determining the DCI based on the single successful decoding.

6. The method of claim 5, wherein determining the DCI comprises:
    if it is determined that there are two or more successful decodings, calculating a reliability of each of the successful decodings;
    selecting a decoding having a highest reliability among the successful decodings; and
    determining the DCI based on the selected decoding.

7. The method of claim 5, wherein it is determined whether each decoding is successful by performing a cyclical redundancy check (CRC) to a decoding result of the signals of each of the PDCCH areas.

8. The method of claim 1, wherein decoding the signals of the PDCCH areas comprises:
    extracting a PDCCH of a specific aggregation level in each PDCCH area; and
    decoding the extracted PDCCH of the specific aggregation level.

9. The method of claim 8, wherein the specific aggregation level is aggregation level 8.

10. A receiver comprising:
    a demodulator that demodulates a signal received from a transmitter;

a channel quality measuring unit that measures a channel quality of the received signal;

a channel decoder that includes a physical downlink control channel (PDCCH) decoder and decodes the demodulated signal for each channel; and a processor that is connected with the channel quality measuring unit and the channel decoder, and that is configured to:

measure the channel quality based on the received signal;

if a measurement of the channel quality is not a configuration condition based on having a value less than a threshold value, decode signals of each of PDCCH areas, in the received signal, indicated by configurable values of a channel format indicator (CFI);

if the measurement of the channel quality is the configuration condition based on having a value greater than or equal to a threshold value, obtain a value of the CFI by decoding a physical control format indicator channel (PCFICH) of the received signal, and decode signals of a PDCCH area indicated by the obtained value of the CFI; and determine a downlink control indicator (DCI) based on the decoded signals.

11. The receiver of claim 10, wherein the processor is further configured to decode a physical downlink shared channel (PDSCH) based on the DCI.

12. The receiver of claim 10, wherein the processor is further configured to measure a signal to interference and noise ratio (SINR) based on the received signal.

13. The receiver of claim 10, wherein the processor is further configured to obtain a maximum value and a minimum value of the decoded PCFICH of the received signal, and measure the channel quality based on a difference between the maximum value and the minimum value.

14. The receiver of claim 10, wherein the processor is further configured to determine whether decoding of the signals of each of the PDCCH areas is successful, and if it is determined that there is a single successful decoding, determining the DCI based on the single successful decoding.

15. The receiver of claim 14, wherein the processor is further configured to, if it is determined that there are two or more successful decodings, calculate a reliability of each of the successful decodings, select a decoding having a highest reliability among the successful decodings, and determine the DCI based on the selected decoding.

16. The receiver of claim 14, wherein the processor is further configured to determine whether each decoding is successful by performing a cyclical redundancy check (CRC) to a decoding result of the signals of each of the PDCCH areas.

17. The receiver of claim 10, wherein the processor is further configured to extract a PDCCH of a specific aggregation level in each PDCCH area, and decode the extracted PDCCH of the specific aggregation level.

* * * * *